(12) United States Patent
Kim

(10) Patent No.: US 11,763,839 B2
(45) Date of Patent: Sep. 19, 2023

(54) VOICE ACTIVITY DETECTION APPARATUS, LEARNING APPARATUS, AND VOICE ACTIVITY DETECTION METHOD

(71) Applicant: KABUSHIKI KAISHA TOSHIBA, Tokyo (JP)

(72) Inventor: Uihyun Kim, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 25 days.

(21) Appl. No.: 17/412,183

(22) Filed: Aug. 25, 2021

(65) Prior Publication Data
US 2022/0284921 A1    Sep. 8, 2022

(30) Foreign Application Priority Data

Mar. 5, 2021    (JP) .................................. 2021-035674

(51) Int. Cl.
*G10L 25/93*    (2013.01)
*G10L 25/30*    (2013.01)
*G10L 25/06*    (2013.01)

(52) U.S. Cl.
CPC .............. *G10L 25/93* (2013.01); *G10L 25/06* (2013.01); *G10L 25/30* (2013.01)

(58) Field of Classification Search
CPC .......... G10L 25/93; G10L 25/30; G10L 25/06
See application file for complete search history.

(56) References Cited

U.S. PATENT DOCUMENTS

| | | | |
|---|---|---|---|
| 10,629,226 B1* | 4/2020 | Tong ........................ | G10L 25/78 |
| 2016/0199038 A1* | 7/2016 | Tsushima ................. | A61B 8/08 |
| 2018/0077278 A1* | 3/2018 | Fujieda .................... | H04M 3/00 |
| 2020/0395042 A1 | 12/2020 | Hanazawa | |
| 2021/0027796 A1* | 1/2021 | Togawa .............. | G10L 21/0208 |

FOREIGN PATENT DOCUMENTS

| | | |
|---|---|---|
| JP | 2011-191423 A | 9/2011 |
| JP | WO2019/162990 A1 | 5/2020 |

OTHER PUBLICATIONS

D. Harwath, et al., "Jointly Discovering Visual Objects and Spoken Words from Raw Sensory Input," arXiv:1804.01452v1, 17 pages (Apr. 4, 2018).

* cited by examiner

*Primary Examiner* — Richemond Dorvil
*Assistant Examiner* — Ethan Daniel Kim
(74) *Attorney, Agent, or Firm* — Finnegan, Henderson, Farabow, Garrett & Dunner, LLP

(57) ABSTRACT

According to one embodiment, a voice activity detection apparatus comprises a processing circuit. The processing circuit calculates an acoustic feature based on an acoustic signal; calculates a non-acoustic feature based on a non-acoustic signal; calculates a correlation coefficient based on the acoustic feature and the non-acoustic feature; and detects a voice section and/or a non-voice section based on a comparison of the correlation coefficient with a threshold, the voice section being a time section in which voice is presence, the non-voice section being a time section in which voice is absence.

14 Claims, 13 Drawing Sheets

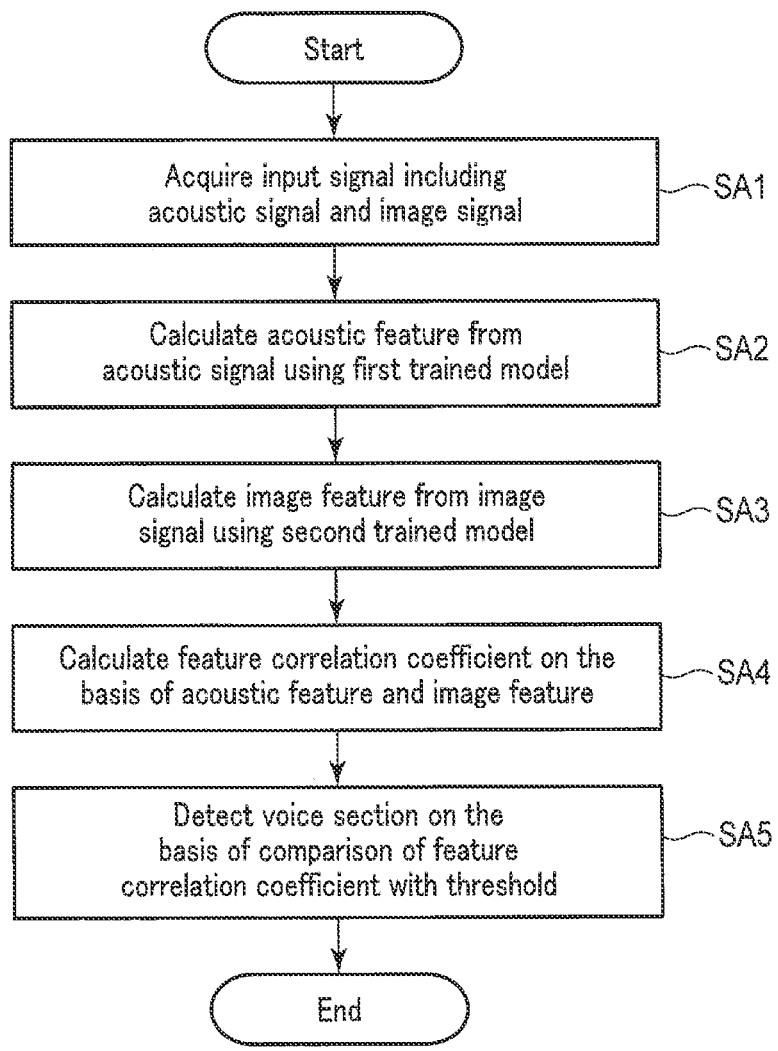
F I G. 2

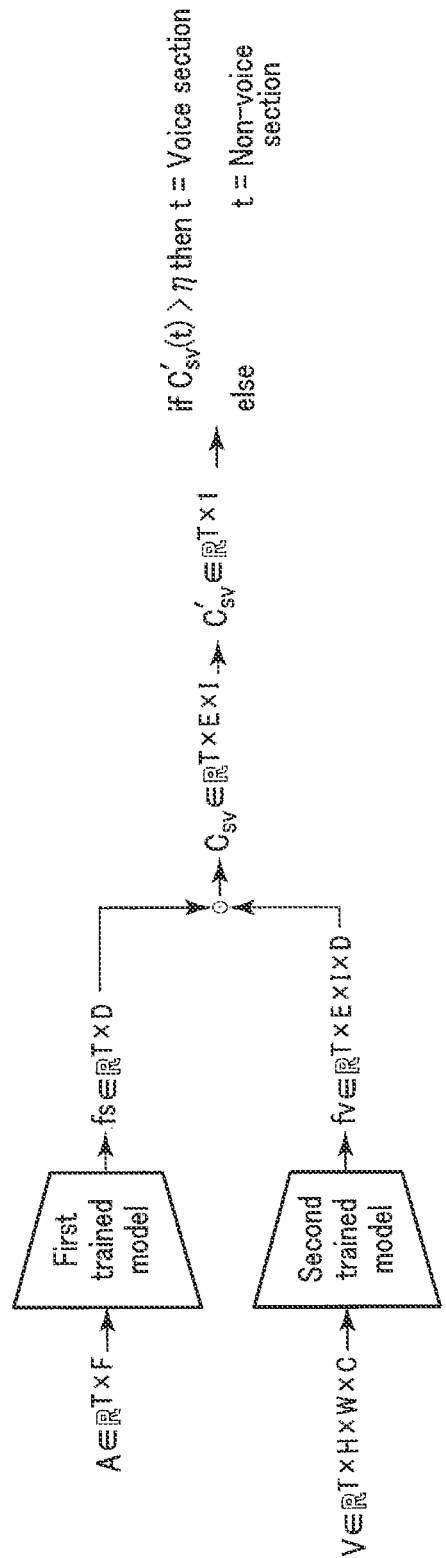
F I G. 3

VOICE ACTIVITY DETECTION APPARATUS, LEARNING APPARATUS, AND VOICE ACTIVITY DETECTION METHOD

CROSS-REFERENCE TO RELATED APPLICATION

This application is based upon and claims the benefit of priority from Japanese Patent Application No. 2021-035674, filed Mar. 5, 2021, the entire contents of which are incorporated herein by reference.

FIELD

Embodiments described herein relate generally to a voice activity detection apparatus, a learning apparatus, and voice activity detection method.

BACKGROUND

Voice activity detection (VAD) is a technique of detecting a voice section including utterance of the user from an input signal. Voice activity detection is mainly used for improving recognition accuracy of voice recognition, and/or used for supporting data compression in a non-voice section in the field of voice encoding.

Voice activity detection requires processing of detecting a voice section including predetermined voice from a time section of an input signal. For example, a predetermined voice section is detected from the input acoustic signal using a model having been trained by a supervised learning based on training data with label representing whether the frame serving as the processing target is a voice section including voice, such as utterance. Examples of a method of preparing labeled training data include a method of manually providing a label and a method of automatically providing a label, but any of the methods requires much work load or calculation load.

BRIEF DESCRIPTION OF THE DRAWINGS

FIG. 2 is a diagram illustrating an example of flow of voice activity detection processing.

FIG. 3 is a diagram schematically illustrating the voice activity detection processing.

DETAILED DESCRIPTION

In general, according to one embodiment, a voice activity detection apparatus comprises a processing circuit. The processing circuit calculate an acoustic feature based on an acoustic signal; calculate a non-acoustic feature based on a non-acoustic signal; calculate a correlation coefficient based on the acoustic feature and the non-acoustic feature; and detect a voice section and/or a non-voice section based on a comparison of the correlation coefficient with a threshold, the voice section being a time section in which voice is presence, the non-voice section being a time section in which voice is absence.

The following is an explanation of a voice activity detection apparatus, a learning apparatus, and a voice activity detection method according to the present embodiment with reference to drawings.

Figure 1:
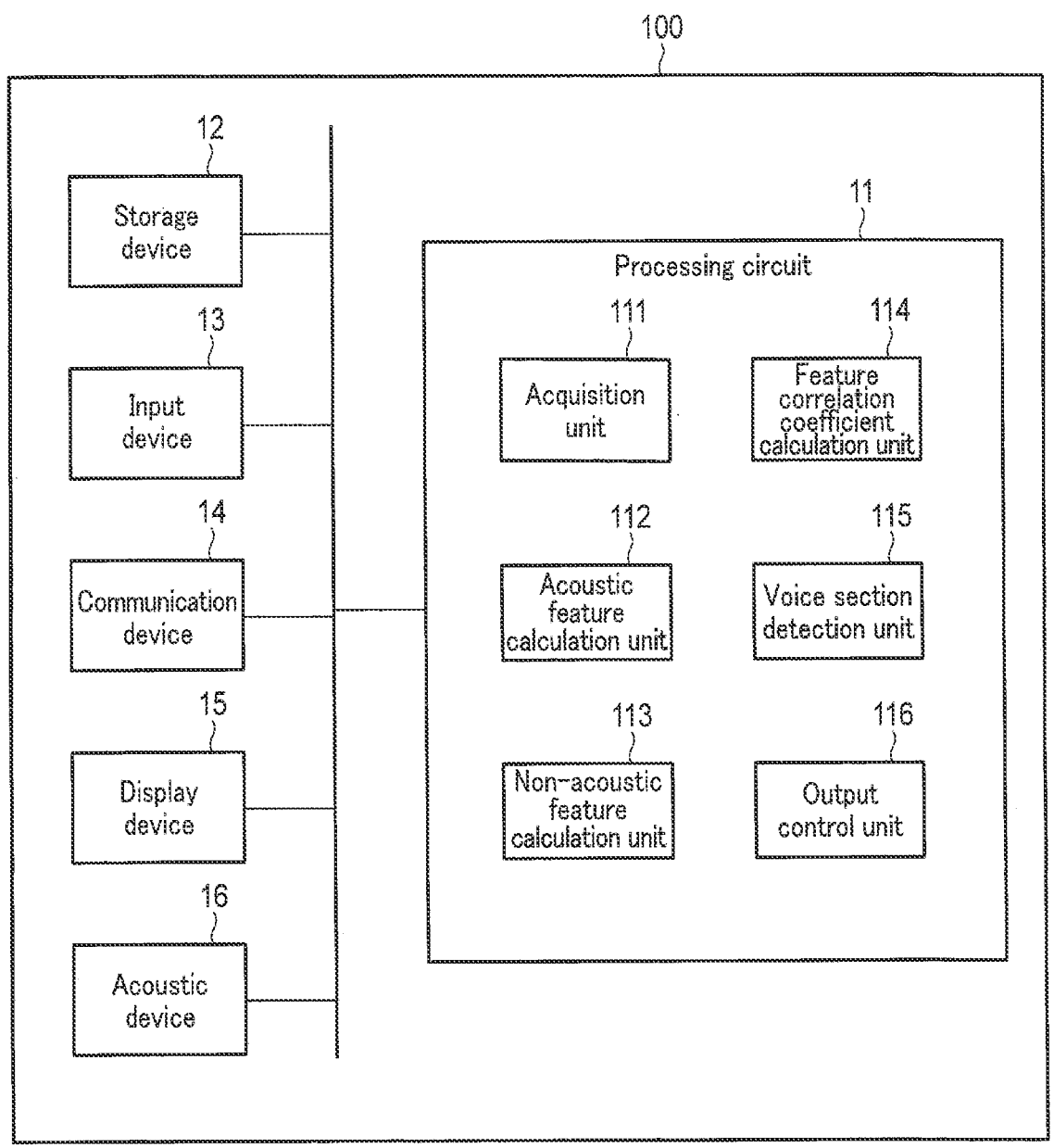
FIG. 1 is a diagram illustrating a configuration example of a voice activity detection apparatus.

FIG. 1 is a diagram illustrating a configuration example of a voice activity detection apparatus 100. The voice activity detection apparatus 100 is a computer detecting a voice section of an input signal. As illustrated in FIG. 1, the voice activity detection apparatus 100 includes a processing circuit 11, a storage device 12, an input device 13, a communication device 14, a display device 15, and an acoustic device 16.

The processing circuit 11 includes a processor, such as a CPU (Central Processing Unit), and a memory, such as a RAM (Random Access Memory). The processing circuit 11 executes voice activity detection processing of detecting a voice section of the input signal, by executing a voice activity detection program stored in the storage device 12. The voice activity detection program is recorded on a non-transitory computer-readable recording medium. The processing circuit 11 achieves an acquisition unit 111, an acoustic feature calculation unit 112, a non-acoustic feature calculation unit 113, a feature correlation coefficient calculation unit 114, a voice section detection unit 115, and an output control unit 116, by reading and executing the voice activity detection program from the recording medium. The voice activity detection program may include a plurality of modules implemented with functions of the acquisition unit 111, the acoustic feature calculation unit 112, the non-acoustic feature calculation unit 113, the feature correlation coefficient calculation unit 114, the voice section detection unit 115, and the output control unit 116 in a divided manner.

Hardware implementation of the processing circuit 11 is not limited to only the mode described above. For example, the processing circuit 11 may be formed of a circuit, such as an application specific integrated circuit (ASIC), achieving the acquisition unit 111, the acoustic feature calculation unit 112, the non-acoustic feature calculation unit 113, the feature correlation coefficient calculation unit 114, the voice section detection unit 115, and/or the output control unit 116. The acquisition unit 111, the acoustic feature calculation unit 112, the non-acoustic feature calculation unit 113, the feature correlation coefficient calculation unit 114, the voice section detection unit 115, and/or the output control unit 116 may be implemented in a single integrated circuit or individually implemented in a plurality of integrated circuits.

The acquisition unit 111 acquires an acoustic signal and a non-acoustic signal relating to the same voice generation source. The acoustic signal and the non-acoustic signal are time-series signals, and are temporally synchronized in units of frame. The supposed voice generation source according to the present embodiment is a human, an animal, and/or a robot and the like. In the following explanation, suppose that the voice generation source is a human. The acoustic signal is a signal relating to voice uttered by a speaker serving as the voice generation source. The non-acoustic signal is a signal other than the acoustic signal relating to the speaker and collected substantially simultaneously with the acoustic signal. For example, the non-acoustic signal is an image signal relating to the uttering speaker, and/or a sensor signal relating to physiological response of lips and/or a face muscle of the speaker generated by utterance.

The acoustic feature calculation unit 112 calculates a feature quantity (hereinafter referred to as "acoustic feature") of the acoustic signal. The acoustic feature has a value based on the acoustic signal and a value correlated with voice uttered by the speaker. The acoustic feature is calculated for each of frames. As an example, the acoustic feature is calculated using a first trained model. The first trained model is a neural network trained to receive an acoustic signal and output an acoustic feature. The first trained model is stored in the storage device 12 or the like.

The non-acoustic feature calculation unit 13 calculates a feature quantity (hereinafter referred to as "non-acoustic feature") of the non-acoustic signal. The non-acoustic feature has a value based on the non-acoustic signal and a value correlated with voice uttered by the speaker. The non-acoustic feature is calculated for each of frames. As an example, the non-acoustic feature is calculated using a second trained model. The second trained model is a neural network trained to input a non-acoustic signal and output a non-acoustic feature. The second trained model is stored in the storage device 12 or the like.

The feature correlation coefficient calculation unit 114 calculates a correlation coefficient on the basis of the acoustic feature and the non-acoustic feature calculated with the non-acoustic feature calculation unit 113. In the following explanation, the correlation coefficient calculated with the feature correlation coefficient calculation unit 114 will be referred to as "feature correlation coefficient". The feature correlation coefficient is a coefficient indicating correlation between the acoustic feature and the non-acoustic feature. The feature correlation coefficient is used as a scale to distinguish a voice section from a non-voice section. The voice section is a time section in which voice is uttered in the time sections of the input signal, and a non-voice section is a time section in which no voice is uttered in the time sections of the input signal. The feature correlation coefficient is calculated for each of frames.

The voice section detection unit 115 detects a voice section and/or a non-voice section based on a comparison of the correlation coefficient with a threshold. The voice section is a time section in which voice is presence. The non-voice section is a time section in which voice is absence.

The output control unit 116 displays various types of information via the display device 15 and/or the acoustic device 16. For example, the output control unit 116 displays an image signal on the display device 15 and/or outputs an acoustic signal via the acoustic device 16.

The storage device 12 is formed of, for example, a ROM (Read Only Memory), a HDD (Hard Disk Drive), a SSD (Solid State Drive), and/or an integrated circuit storage device. The storage device 12 stores therein various arithmetic calculation results acquired with the processing circuit 11 and/or the voice section detection program executed with the processing circuit 11 and the like. The storage device 12 is an example of a computer-readable recording medium.

The input device 13 inputs various commands from the user. Applicable examples of the input device 13 include a keyboard, a mouse, various types of switches, a touch pad, and a touch panel display. The output signal from the input device 13 is supplied to the processing circuit 11. The input device 13 may be a computer connected with the processing circuit 11 in a wired or wireless manner.

The communication device 14 is an interface to execute information communication with an external device connected with the voice activity detection apparatus 100 via a network. The communication device 14 receives an acoustic signal and a non-acoustic signal from, for example, a device collecting the acoustic signal and the non-acoustic signal, and/or receives the first trained model and the second trained model from a learning apparatus described later.

The display device 15 displays various types of information. Applicable examples of the display device 15 include a CRT (Cathode-Ray Tube) display, a liquid crystal display, an organic EL (Electro Luminescence) display, a LED (Light-Emitting Diode) display, a plasma display, and any other displays known in the technical field. The display device 15 may be a projector.

The acoustic device 16 converts an electrical signal into voice and emits the voice. Applicable examples of the acoustic device 16 include a magnetic loudspeaker, a dynamic loudspeaker, a capacitor loudspeaker, and any other loudspeakers known in the technical field.

The following is an explanation of an example of voice activity detection processing executed with the processing circuit 11 of the voice activity detection apparatus 100. To specifically execute the following explanation, suppose that the non-acoustic signal is an image signal.

FIG. 2 is a diagram illustrating an example of flow of voice activity detection processing executed with the processing circuit 11. FIG. 3 is a diagram schematically illustrating the voice activity detection processing. The voice activity detection processing is executed with an operation of the processing circuit 11 in accordance with the voice activity detection program stored in the storage device 12 or the like.

As illustrated in FIG. 2 and FIG. 3, the acquisition unit 111 acquires an input signal including an acoustic signal and an image signal (Step SA1). The input signal is a video signal including an acoustic signal and an image signal temporally synchronized with each other.

Figure 4:
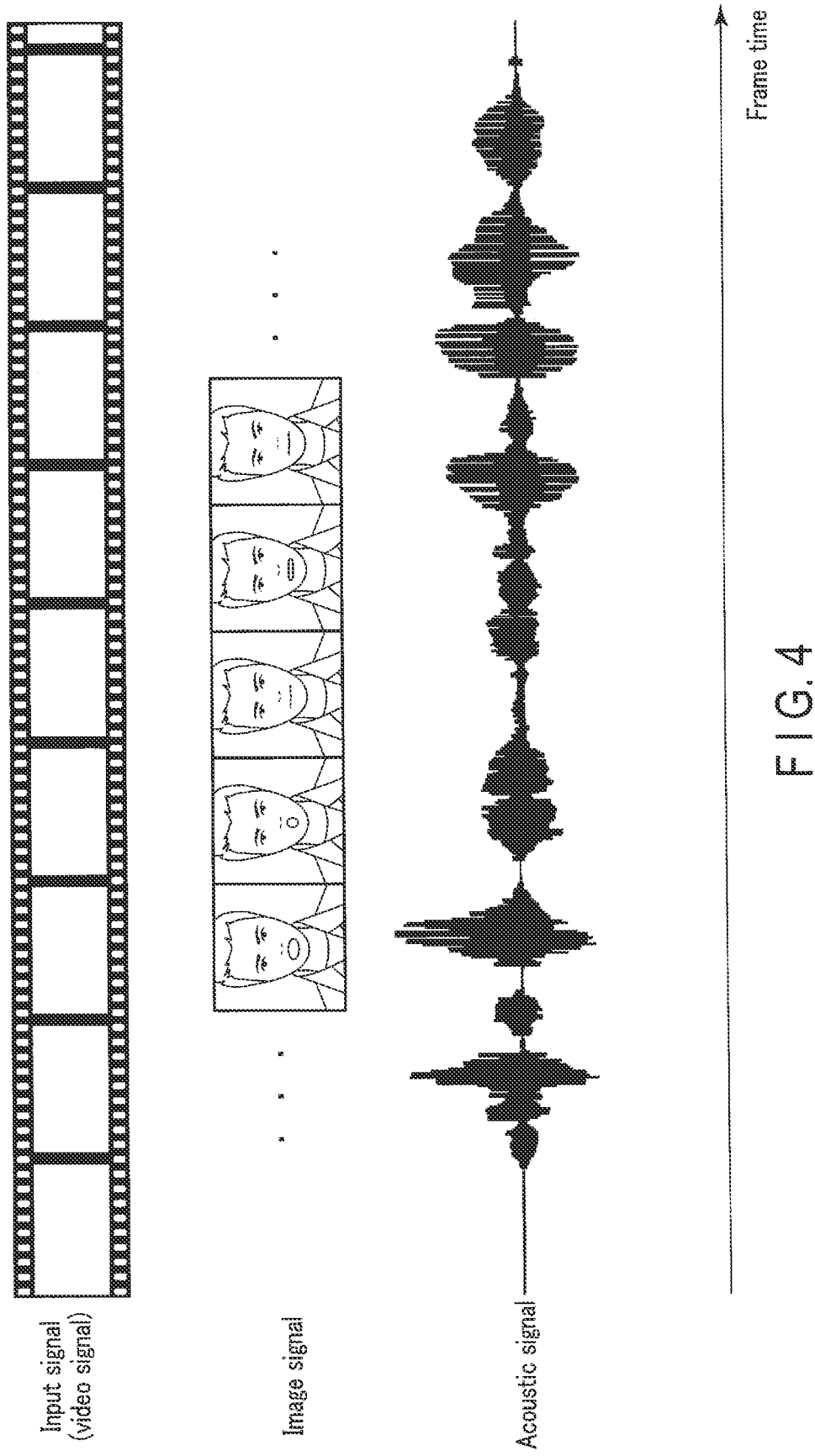
FIG. 4 is a diagram illustrating an example of an input signal (video signal), an acoustic signal, and an image signal.

FIG. 4 is a diagram illustrating an example of an input signal (video signal), an acoustic signal, and an image signal. As illustrated in FIG. 4, a video signal is a time-series signal including a time-series acoustic signal and a time-series image signal temporally synchronized with each other. The length of the time sections of the video signal is not particularly limited, but is supposed to be a frame length of 10 seconds or around. The video signal is collected with a video camera device including a microphone and an imaging device. The acoustic signal is collected with the microphone. The microphone collects voice relating to utterance of the speaker, converts the sound pressure of the collected voice into an analog electrical signal (acoustic signal), and subjects the acoustic signal to A/D conversion to convert the acoustic signal into a digital time region electrical signal (acoustic signal). The time region acoustic signal is acquired with the acquisition unit 111, and converted into a frequency region acoustic signal by short-time Fourier transform or the like. The image signal is collected almost simultaneously with the acoustic signal. The image signal is collected with the imaging device including a plurality of imaging elements, such as a CCD (Chard Coupled Device). The imaging device optically images the uttering speaker, and generates an image signal (image data) of a digital spatial region image signal (image data) relating to the speaker in units of frame. The image signal is required to be correlated with the speaker's utterance. As the imaging target, the image frame is required to include at least a lip region the form of which is changed in accordance with utterance. The image frame may include the whole face region of the speaker, or the whole body region of the speaker. The image signal is acquired in units of frame with the acquisition unit 111.

In this example, suppose that the time-series acoustic signal A and the time-series image signal V are defined in accordance with the following expression (1). The time-series acoustic signal A is an acoustic signal including a T dimension of the time region and a F dimension of the frequency region of the frame serving as the processing target. The image signal V is an image signal including dimensions of the time T, the height H, the width W, and a color channel C.

$$A \in \mathbb{R}^{T \times F}$$

$$V \in \mathbb{R}^{T \times H \times W \times C} \quad (1)$$

When Step SA1 is executed, the acoustic feature calculation unit 112 calculates an acoustic feature $f_s$ from the acoustic signal A acquired at Step SA1 using the first trained model (Step SA2). The acoustic feature $f_s$ is calculated on the basis of the acoustic signal A for each of the frames. The acoustic feature $f_s$ is time-series data. The first trained model is a neural network trained to receive the acoustic signal A and output the acoustic feature $f_s$. For example, an encoder network trained to convert the acoustic signal A into the acoustic feature $f_s$ is used as the neural network.

Figure 5:
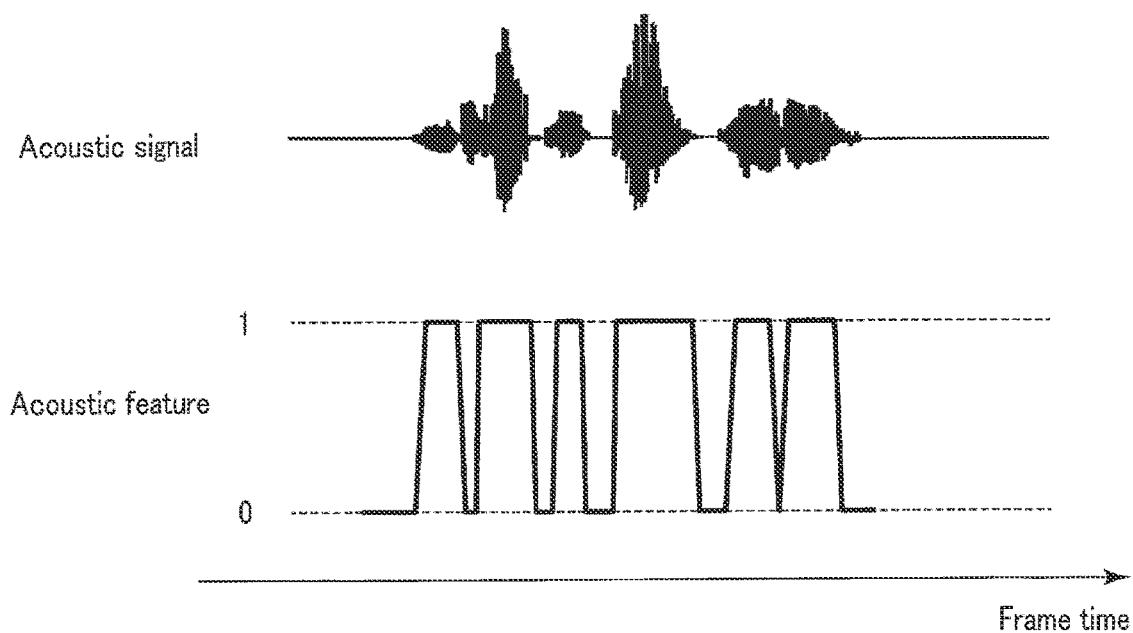
FIG. 5 is a diagram illustrating relation between the acoustic signal and a sound feature.

FIG. 5 is a diagram illustrating relation between the acoustic signal and the acoustic feature. As illustrated in FIG. 5, the acoustic signal is time-series waveform data of sound pressure values of the voice uttered by the speaker. The acoustic signal is correlated with the voice uttered by the speaker. For example, the peak value of the acoustic signal has a relatively high value when the speaker utters, and has a relatively low value when the speaker does not utter. The acoustic feature is designed such that the value has correlation with the peak value of the acoustic signal, in other words, to distinguish a voice component and a silent component included in the acoustic signal. For example, the value of the acoustic feature increases as the peak value of the acoustic signal increases, and the value of the acoustic feature decreases as the peak value of the acoustic signal decreases.

For example, as illustrated in FIG. 5, the acoustic feature is designed such that the peak value has a value between an upper limit value "1" and a lower limit value "0". When the peak value of the acoustic signal has a value at the time when the speaker utters voice, the acoustic feature has a value "1". When the peak value of the acoustic signal has a value at the time when the speaker does not utter voice, the acoustic feature has a value "0". The value that the acoustic feature can take may be two values, that is, "0" and "1", three or more discrete values, or continuous values extending from the lower limit value to the upper limit value.

When Step SA2 is executed, the non-acoustic feature calculation unit 113 calculates an image feature $f_v$ from the image signal V acquired at Step SA1 using the second trained model (Step SA3). The image feature $f_v$ is calculated on the basis of the image signal V for each of frames. Specifically, the image feature $f_v$ is time-series data. The second trained model is a neural network trained to receive the image signal V and output the image feature $f_v$. For example, an encoder network trained to convert the image signal V into the image feature $f_v$ is used as the neural network. When the image feature $f_v$ is calculated, no special preprocessing for the image signal V is required.

Figure 6:
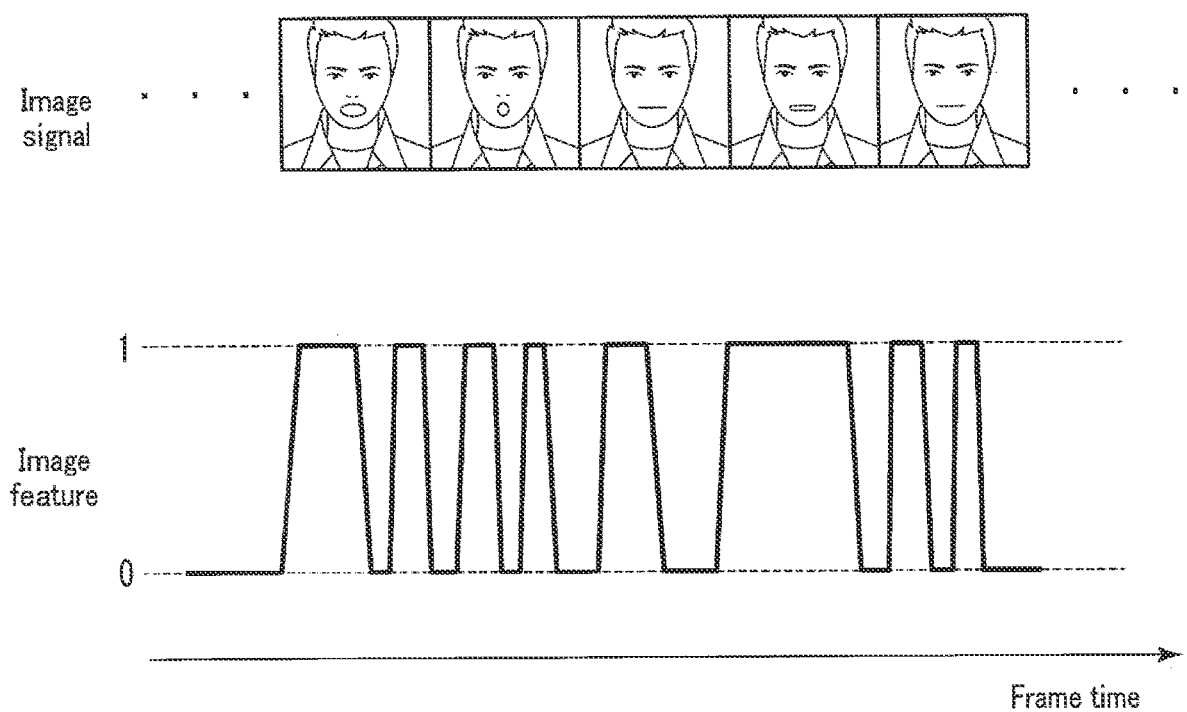
FIG. 6 is a diagram illustrating relation between the image signal and an image feature.

FIG. 6 is a diagram illustrating relation between the image signal and the image feature. As illustrated in FIG. 6, the image signal is correlated with the form of the face part region at the time when the speaker is uttering voice. The image feature is designed to distinguish an utterance component from a non-utterance component included in the image signal. Specifically, the lip region of the speaker indicated with the image signal has different forms between the time when the speaker utters voice and the time when the speaker does not utter sound. The image feature is designed such that the value thereof is correlated with the form of the face part region of the speaker. For example, the image feature has a higher value as the speaker opens one's mouth wider, and the image feature has a lower value as the speaker closes one's mouth.

For example, as illustrated in FIG. 6, the image feature is designed such that the peak value has a value between the upper limit value "1" and the lower limit value "0". The image feature has a value "1" when the speaker's mouth is opened, and the image feature has a value "0" when the speaker's mouth is closed. The value that the image feature can take may be two values, that is, "0" and "1", three or more discrete values, or continuous values extending from the lower limit value to the upper limit value.

The order of Step SA2 and Step SA3 is not particularly limited. Step SA2 may be executed after Step SA3, or Step SA2 and Step SA3 may be executed in parallel.

When Step SA3 is executed, the feature correlation coefficient calculation unit 114 calculates a feature correlation coefficient on the basis of the acoustic feature calculated at Step SA2 and the image feature calculated at Step SA3 (Step SA4). At Step SA4, first, the feature correlation coefficient calculation unit 114 calculates a correlation coefficient (hereinafter referred to as "first feature correlation coefficient") $C_{sv}$ based on the inner product of the acoustic feature $f_s$ and the image feature $f_v$. The first feature correlation coefficient $C_{sv}$ is expressed with the following expression (2).

$$C_{sv}(t, e, i) = \frac{f_v(t, e, i)^T \cdot f_s(t)}{\|f_v(t, e, i)\| \cdot \|f_s(t)\|} \quad (2)$$

In the expression, $f_s(t)$ is an acoustic feature vector at the frame time $t \in \{1, 2, \ldots, T\}$, and serves as an example of the acoustic feature. $f_v(t, e, i)$ is an image feature vector at the ordinate $e \in \{1, 2, \ldots, E\}$ compressed to the E dimension and the abscissa $i \in \{1, 2, \ldots, I\}$ compressed to the I dimension, and an example of the image feature. The sign "$(\cdot)^T$" indicates transposition processing, and the sign "$\|\cdot\|$"

indicates L2 norm. Specifically, the first feature correlation coefficient $C_{sv}$ is cosine similarity to measure the distance between the acoustic feature $f_s$ and the image feature $f_v$. The first feature correlation coefficient $C_{sv}$ is not limited to cosine similarity, as long as it is an index to measure the distance between the acoustic feature $f_s$ and the image feature $f_v$. For example, the first feature correlation coefficient $C_{sv}$ may be a Euclidean distance, a Manhattan distance, or a Mahalanobis distance.

Thereafter, the feature correlation coefficient calculation unit 114 calculates the second feature correlation coefficient $C'_{sv}(t)$ on the basis of the first feature correlation coefficient $C_{sv}(t, e, i)$. The second feature correlation coefficient $C'_{sv}(t)$ is calculated for each frame time t, and expressed with, for example, the following expression (3). The sign "max ( )" indicates the scalar value of the maximum spatial response for the dimension E and the dimension I. Specifically, the second feature correlation coefficient $C'_{sv}(t)$ is calculated for each frame time t, and is a maximum value in a plurality of first feature correlation coefficients $C_{sv}$ corresponding to a plurality of combinations (pixels) of the dimension E and the dimension I. The second feature correlation coefficient $C'_{sv}(t)$ is a feature correlation coefficient of the final output form. The second feature correlation coefficient may be any value based on a plurality of first feature correlation coefficients corresponding to a plurality of combinations of the ordinate e and the abscissa i, for example, may be any p-quartile, such as the minimum value, the intermediate value, and the mean value in a plurality of first feature correlation coefficients. The first feature correlation coefficient in any noted combination (pixel) of the ordinate e and abscissa I may be set as the second feature correlation coefficient.

$$C'_{sv}(t) = \max_{e,i} C_{sv}(t, e, i) \quad (3)$$

Figure 7:
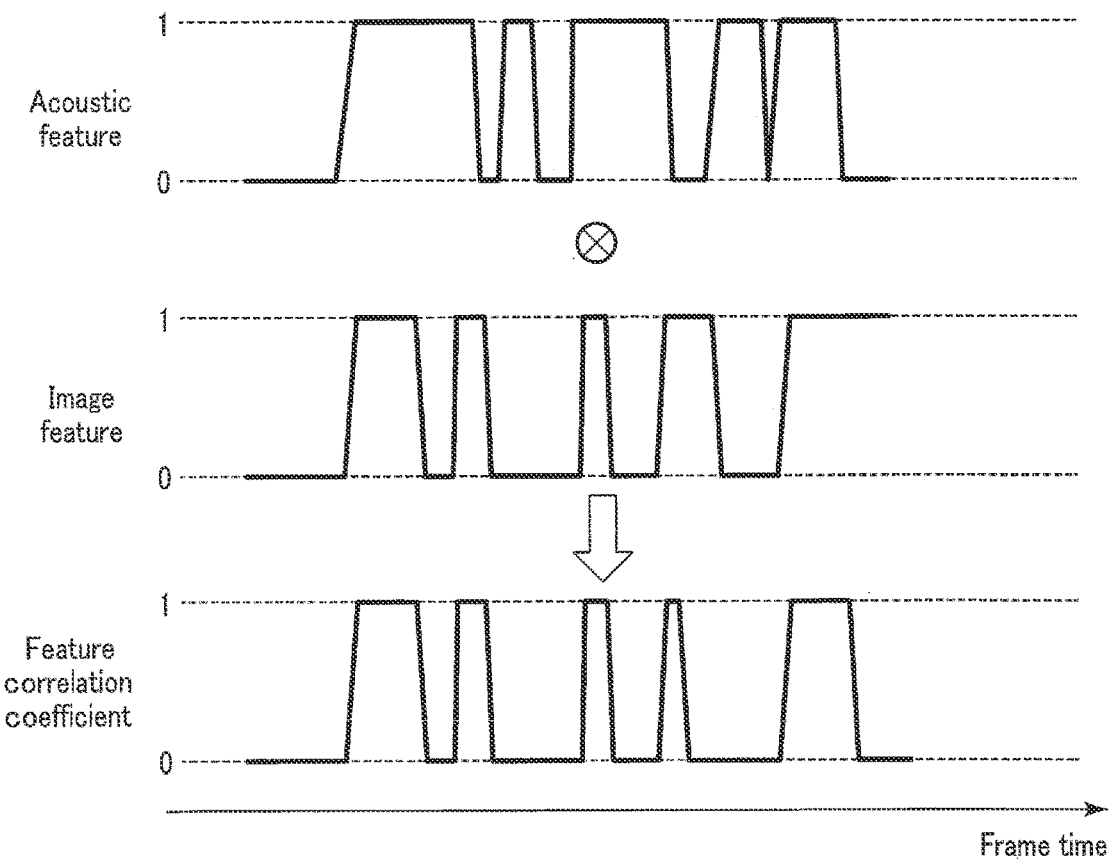
FIG. 7 is a diagram illustrating an example of a synchronized correlation coefficient and an unsynchronized correlation coefficient.

FIG. 7 is a diagram illustrating an example of the feature correlation coefficient (second feature correlation coefficient). As illustrated in FIG. 7, the second feature correlation coefficient is a coefficient indicating correlation between the acoustic feature and the image feature. The second feature correlation coefficient is calculated by multiplying the value of the acoustic feature by the value of the image feature for each of the same frame times. In other words, the second feature correlation coefficient calculated with the feature correlation coefficient calculation unit 114 indicates a correlation coefficient based on the acoustic feature and the image feature temporally synchronized with each other. As illustrated in FIG. 7, when both the acoustic feature and the image feature have a value "1", that is, when both the acoustic feature and the image feature indicate utterance, the second feature correlation coefficient has the value "1". When one of the acoustic feature and the image feature have a value "0", that is, when one of the acoustic feature and the image feature does not indicate utterance, the second feature correlation coefficient has the value "0".

When Step SA4 is executed, the voice section detection unit 115 detects a voice section on the basis of comparison of the second feature correlation coefficient $C'_{sv}$ calculated at Step SA4 with the threshold η (Step SA5).

Figure 8:
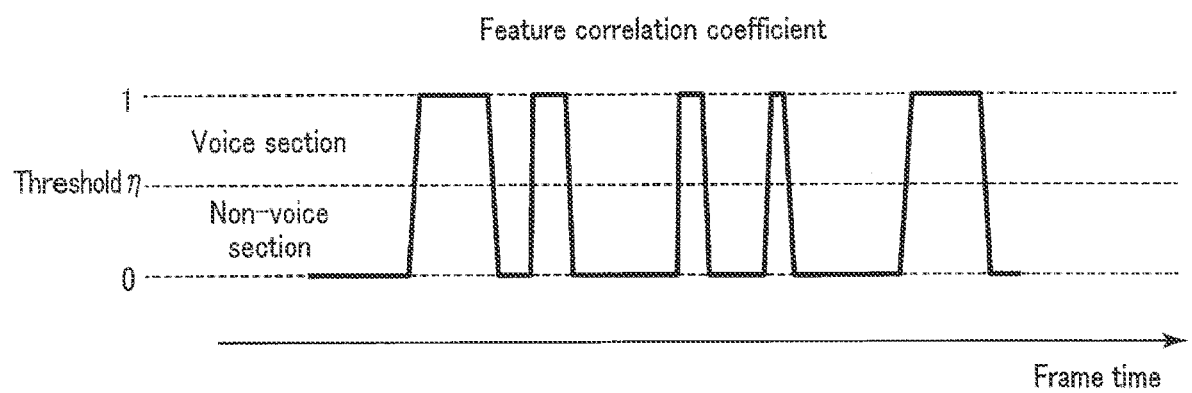
FIG. 8 is a diagram illustrating a detection example of a voice section.

FIG. 8 is a diagram illustrating a detection example of the voice section. As illustrated in FIG. 8, the value of the second feature correlation coefficient is compared with the threshold η for each frame time. The threshold η is set to a boundary between the value corresponding to utterance and the value not corresponding to utterance. For example, when the second feature correlation coefficient has the value ranging from "1" to "0", the threshold η is set to the value "0.5". When the value of the second feature correlation coefficient is larger than the threshold η, the frame time is determined as a voice section. When the value of the second feature correlation coefficient is smaller than the threshold η, the frame time is determined as a non-voice section. By executing the determination processing for each frame time, the voice sections and the non-voice sections are detected in the time sections corresponding to the input signal. A label of a voice section or a non-voice section is assigned to each frame time of the input signal.

The voice activity detection processing with the processing circuit 11 is finished with the operation described above. The input signal after voice activity detection is subjected to processing, such as voice recognition and data compression.

As described above, the voice activity detection apparatus 100 according to the present embodiment includes the acoustic feature calculation unit 112, the non-acoustic feature calculation unit 113, the feature correlation coefficient calculation unit 114, the voice section detection unit 115. The acoustic feature calculation unit 112 calculates an acoustic feature on the basis of the acoustic signal. The acoustic feature has a value correlated with pronunciation. The non-acoustic feature calculation unit 113 calculates an acoustic feature on the basis of the non-acoustic signal. The non-acoustic feature has a value correlated with pronunciation. The feature correlation coefficient calculation unit 114 calculates a feature correlation coefficient on the basis of the acoustic feature and the non-acoustic feature. The voice section detection unit 115 detects a voice section serving as a time section in which voice is uttered and/or a non-voice section serving as a time section in which no voice is uttered, on the basis of comparison of the feature correlation coefficient with the threshold.

The acoustic feature and the non-acoustic feature are designed on the assumption that a time section having a large value is a voice section and a time section having a small value is a non-voice section. With the structure described above, the feature correlation coefficient of the acoustic feature and the non-acoustic feature both correlated with voice is used as a scale to distinguish the voice section and the non-voice section. This structure enables detection of a voice section and/or a non-voice section by comparing the feature correlation coefficient with the threshold. As described above, the present embodiment enables detection of a voice section by simple processing.

Preferably, the acoustic feature is calculated from an acoustic signal using the first trained model, and the non-acoustic feature is calculated from a non-acoustic signal using the second trained model. The first trained model and the second trained model are generated by self-supervised learning using a loss function defined on the basis of the feature correlation coefficient (synchronized correlation coefficient) calculated on the basis of the acoustic feature and the non-acoustic feature temporally synchronized with each other and the feature correlation coefficient (unsynchronized correlation coefficient) calculated on the basis of the acoustic feature and the non-acoustic feature temporally unsynchronized with each other. In the self-supervised learning according to the present embodiment, the first neural network and the second neural network are trained on the basis of a loss function using the synchronized correlation coefficient as a positive sample and the unsynchronized correlation coefficient as a negative sample. By using such a loss function, the first neural network and the second neural network are trained such that the synchronized correlation coefficient increases and the unsynchronized correlation coefficient decreases, that is, to reinforce discrimination for voice and non-voice of the acoustic feature and the non-acoustic feature. By acquiring the acoustic feature and the non-acoustic feature using the first trained model and the second trained model acquired by self-supervised learning as described above, the detection accuracy for a voice section and/or a non-voice section can be further improved.

The following is an explanation of a learning apparatus 200 according to the present embodiment.

Figure 9:
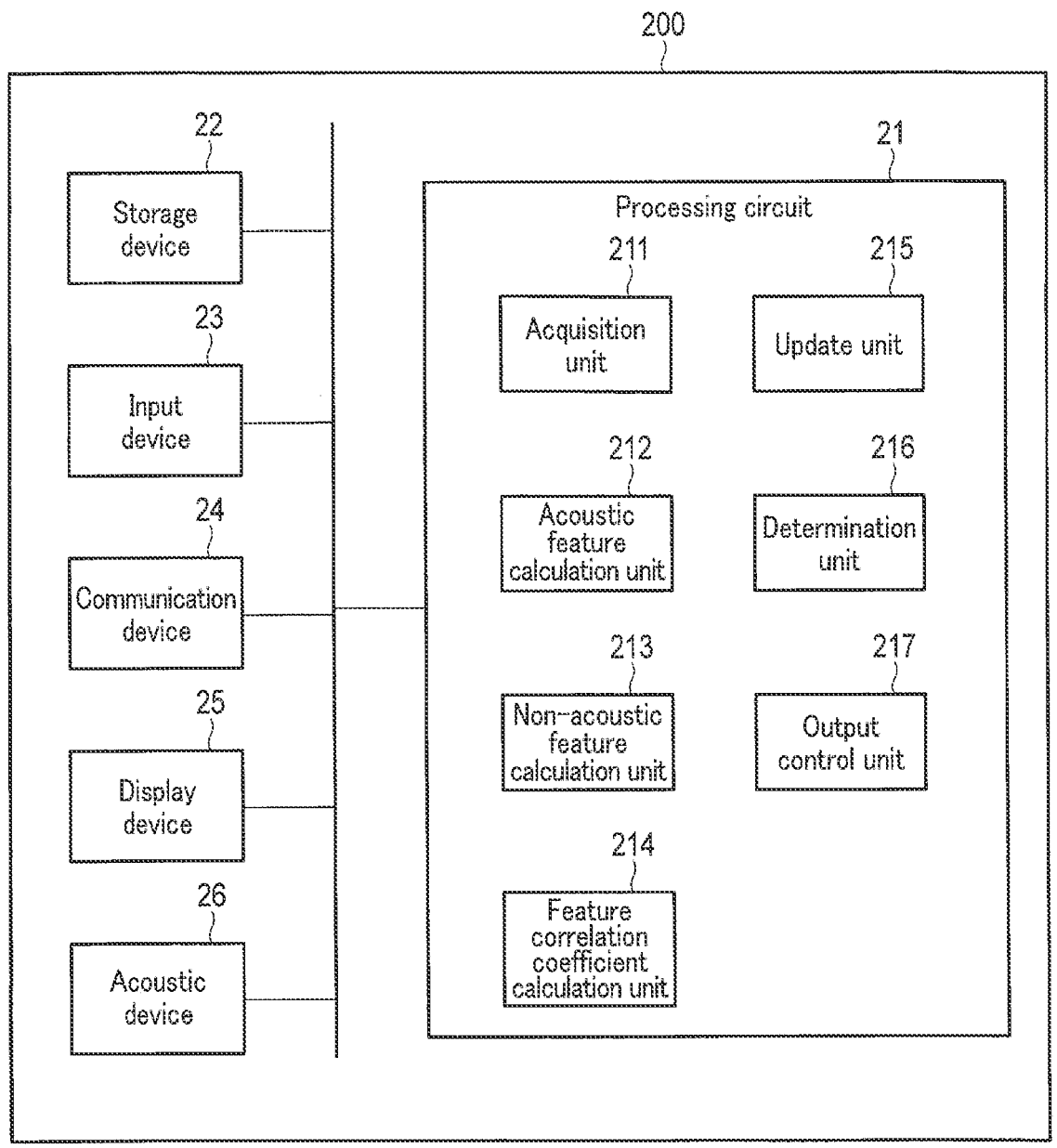
FIG. 9 is a diagram illustrating a configuration example of a learning apparatus.

FIG. 9 is a diagram illustrating a configuration example of the learning apparatus 200. The learning apparatus 200 is a computer generating a first trained model used for calculation of the acoustic feature and a second trained model used for calculation of the image feature. As illustrated in FIG. 9, the learning apparatus 200 includes a processing circuit 21, a storage device 22, an input device 23, a communication device 24, a display device 25, and an acoustic device 26.

The processing circuit 21 includes a processor, such as a CPU, and a memory, such as a RAM. The processing circuit 21 executes learning processing to perform self-supervised learning of the first trained model and the second trained model, by executing a learning program stored in the storage device 22. The learning program is recorded on a non-transitory computer-readable recording medium. The processing circuit 21 achieves an acquisition unit 211, an acoustic feature calculation unit 212, a non-acoustic feature calculation unit 213, a feature correlation coefficient calculation unit 214, an update unit 215, a determination unit 216, and an output control unit 217, by reading and executing the learning program from the recording medium. The learning program may include a plurality of modules implemented with functions of the acquisition unit 211, the acoustic feature calculation unit 212, the non-acoustic feature calculation unit 213, the feature correlation coefficient calculation unit 214, the update unit 215, the determination unit 216, and the output control unit 217 in a divided manner.

Hardware implementation of the processing circuit 21 is not limited to only the mode described above. For example, the processing circuit 21 may be formed of a circuit, such as an application specific integrated circuit (ASIC), achieving the acquisition unit 211, the acoustic feature calculation unit 212, the non-acoustic feature calculation unit 213, the feature correlation coefficient calculation unit 214, the update unit 215, the determination unit 216, and/or the output control unit 217. The acquisition unit 211, the acoustic feature calculation unit 212, the non-acoustic feature calculation unit 213, the feature correlation coefficient calculation unit 214, the update unit 215, the determination unit 216, and/or the output control unit 217 may be implemented in a single integrated circuit or individually implemented in a plurality of integrated circuits.

The acquisition unit 211 acquires training data including a plurality of training samples. Each of the training samples is an input signal including an acoustic signal and a non-acoustic signal. The input signal is a time-series signal, and includes a time-series acoustic signal and a time-series non-acoustic signal. As described above, the non-acoustic signal is an image signal relating to the uttering speaker, and/or a sensor signal relating to physiological response of lips and/or a face muscle of the speaker generated by utterance.

The acoustic feature calculation unit 212 calculates an acoustic feature from the acoustic signal using a first neural network. The acoustic feature calculated with the acoustic feature calculation unit 212 is similar to the acoustic feature calculated with the acoustic feature calculation unit 112.

The non-acoustic feature calculation unit 213 calculates a non-acoustic feature from the non-acoustic signal using a second neural network. The non-acoustic feature calculated with the non-acoustic feature calculation unit 213 is similar to the non-acoustic feature calculated with the non-acoustic feature calculation unit 113.

The feature correlation coefficient calculation unit 214 calculates a feature correlation coefficient on the basis of the acoustic feature and the non-acoustic feature temporally synchronized with each other. The term "temporally synchronized" means that the frame time of the acoustic feature coincidences with the frame time of the non-acoustic feature. The feature correlation coefficient is referred to as "synchronized correlation coefficient". The feature correlation coefficient calculation unit 214 also calculates a feature correlation coefficient on the basis of the acoustic feature and the non-acoustic feature temporally unsynchronized with each other. The term "temporally unsynchronized" means that the frame time of the acoustic feature does not coincidence with the frame time of the non-acoustic feature. The feature correlation coefficient is referred to as "unsynchronized correlation coefficient".

The update unit 215 updates the first neural network and the second neural network using a loss function based on the synchronized correlation coefficient and the unsynchronized correlation coefficient.

The determination unit 216 determines whether a stop condition for learning processing is satisfied. When it is determined that the stop condition is not satisfied, processing is executed, that is, the acoustic feature calculation unit 212 calculates the acoustic feature, the non-acoustic feature calculation unit 213 calculates the non-acoustic feature, the feature correlation coefficient calculation unit 214 calculates the synchronized correlation coefficient, the feature correlation coefficient calculation unit 214 calculates the unsynchronized correlation coefficient, and the update unit 215 updates the first neural network and the second neural network. When it is determined that the stop condition is satisfied, the first neural network at the point in time is output as the first trained model, and the second neural network at the point in time is output as the second trained model.

The output control unit 217 displays various types of information via the display device 25 and/or the acoustic device 26. For example, the output control unit 217 displays an image signal on the display device 25 and/or outputs an acoustic signal via the acoustic device 26.

The storage device 22 is formed of, for example, a ROM, a HDD, a SSD, and/or an integrated circuit storage device. The storage device 22 stores therein various arithmetic calculation results acquired with the processing circuit 21 and/or the learning program executed with the processing circuit 21 and the like. The storage device 22 is an example of a computer-readable recording medium.

The input device 23 inputs various commands from the user. Applicable examples of the input device 23 include a keyboard, a mouse, various types of switches, a touch pad, and a touch panel display. The output signal from the input device 23 is supplied to the processing circuit 21. The input device 23 may be a computer connected with the processing circuit 21 in a wired or wireless manner.

The communication device 24 is an interface to execute information communication with an external device connected with the learning apparatus 200 via a network.

The display device 25 displays various types of information. Applicable examples of the display device 25 include a CRT display, a liquid crystal display, an organic EL display, a LED display, a plasma display, and any other displays known in the technical field. The display device 25 may be a projector.

The acoustic device 26 converts an electrical signal into voice and emits the voice. Applicable examples of the acoustic device 26 include a magnetic loudspeaker, a dynamic loudspeaker, a capacitor loudspeaker, and any other loudspeakers known in the technical field.

The following is an explanation of an example of learning processing executed with the processing circuit 21 of the learning apparatus 200. To specifically execute the following explanation, suppose that the non-acoustic signal is an image signal.

Figure 10:
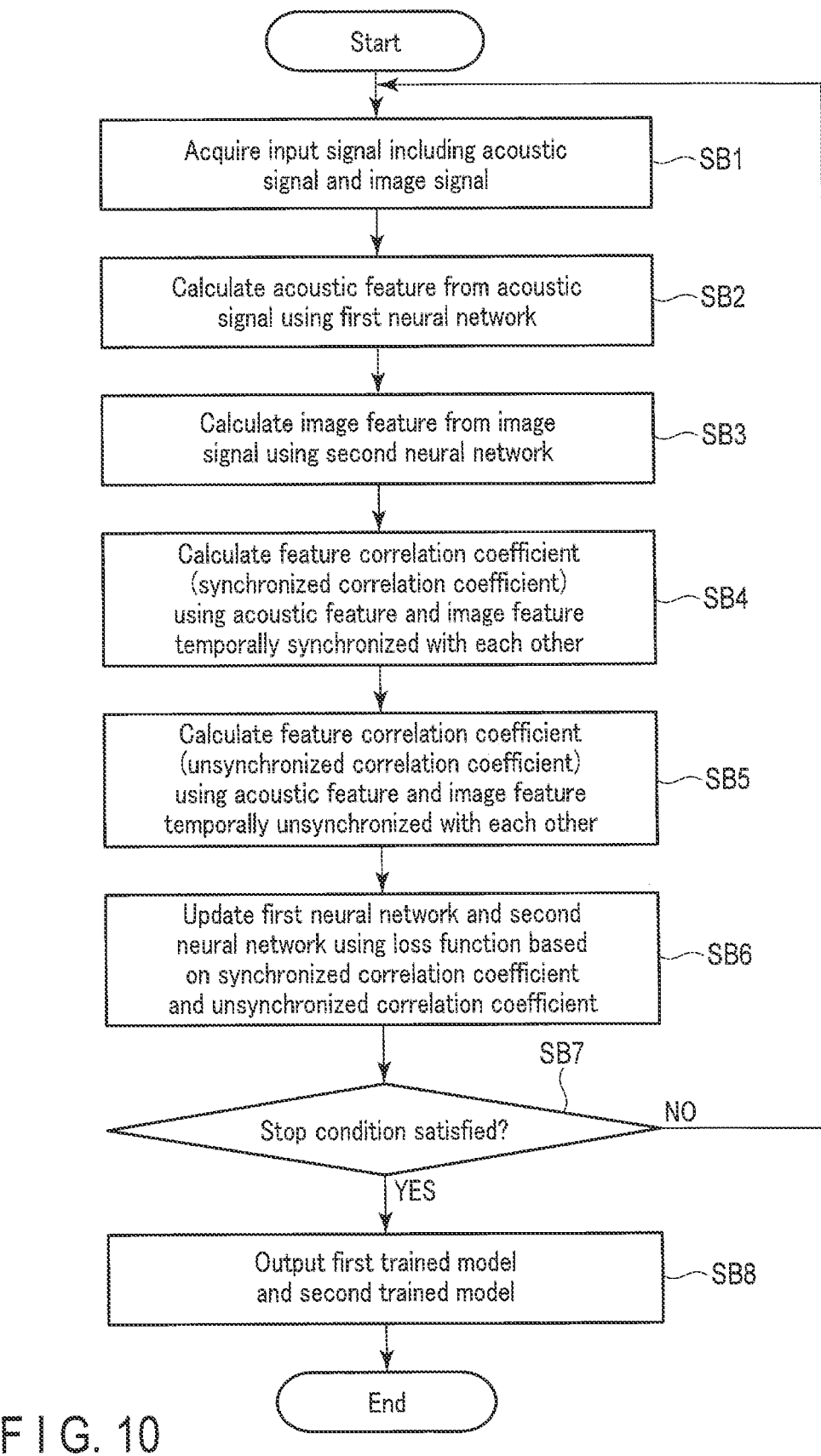
FIG. 10 is a diagram illustrating an example of flow of learning processing.
Figure 11:
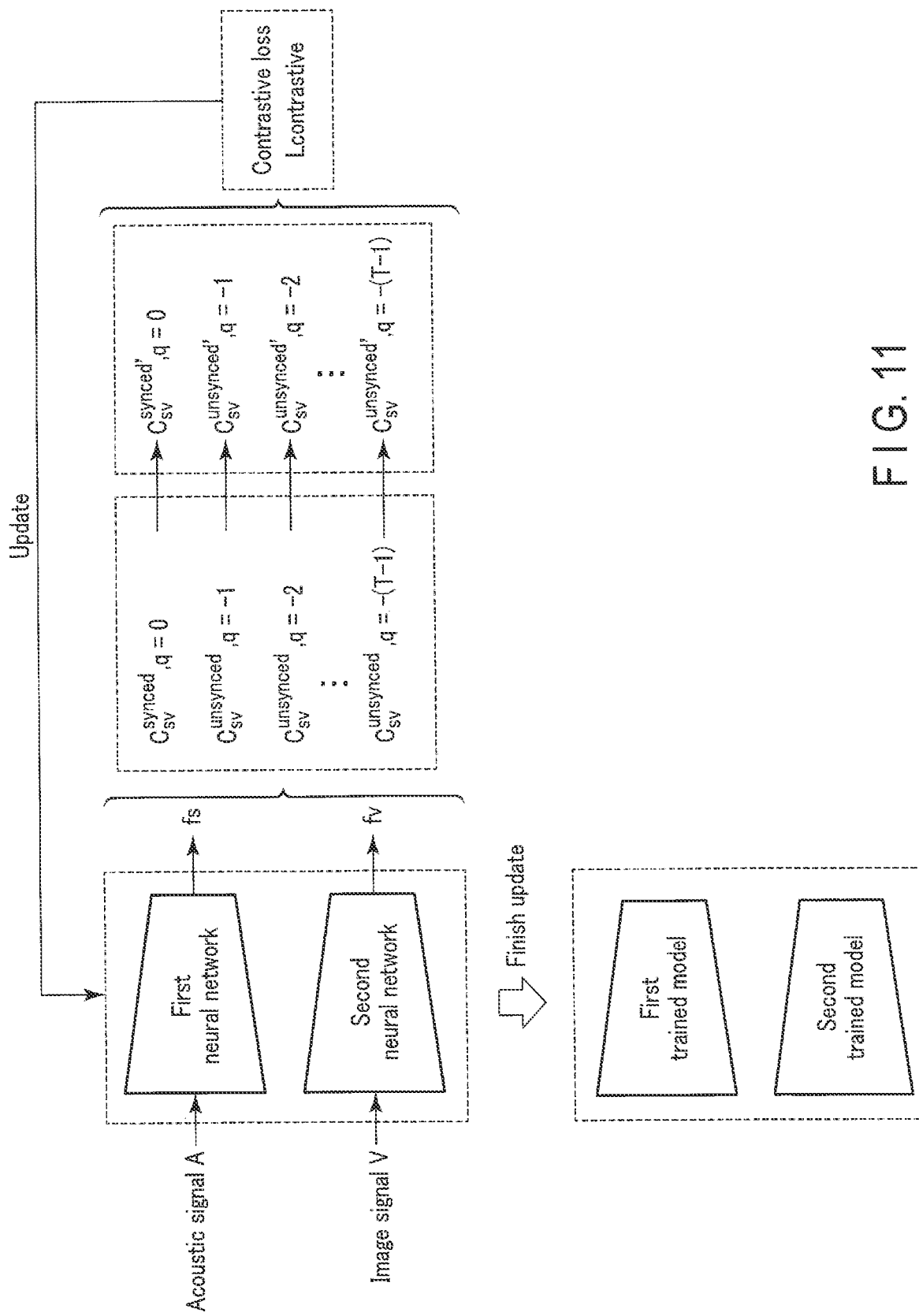
FIG. 11 is a diagram schematically illustrating the learning processing.

FIG. 10 is a diagram illustrating an example of flow of learning processing executed with the processing circuit 21. FIG. 11 is a diagram schematically illustrating the learning processing. The learning processing is executed by operation of the processing circuit 21 in accordance with the learning program stored in the storage device 22 or the like. In the learning processing, the processing circuit 21 trains the first neural network and the second neural network by self-supervised learning using the synchronized correlation coefficient as a positive sample and the unsynchronized correlation coefficient as a negative sample. Suppose that initial values of learning parameters are assigned to the first neural network and the second neural network. The learning parameters are weight and/or bias, and the like. Any hyperparameters may be included as the learning parameters.

As illustrated in FIG. 10 and FIG. 11, the acquisition unit 211 acquires an input signal including an acoustic signal A and an image signal V (Step SB1). At Step SB1, an input signal serving as a training sample is acquired. The frame length of the time sections of the input signal is not particularly limited, but is supposed to be, for example, 10 seconds or around. The image signal V is not required to be subjected to preprocessing, such as extraction of a region correlation with utterance, such as a lip region, and annotation. The acoustic signal A and the image signal V included in the input signal are temporally synchronized with each other.

When Step SB1 is executed, the acoustic feature calculation unit 112 calculates an acoustic feature $f_s$ from the acoustic signal A acquired at Step SB1 using the first neural network (Step SB2). Learning of the first neural network at Step SB2 is not finished. The first neural network includes architecture of an encoder network such that the first neural network can calculate the acoustic feature $f_s$ from the acoustic signal A.

When Step SB2 is executed, the non-acoustic feature calculation unit 113 calculates an image feature $f_v$ from the image signal V acquired at Step SB1 using the second neural network (Step SB3). Learning of the second neural network at Step SB3 is not finished. The second neural network includes architecture of an encoder network such that the second neural network can calculate the image feature $f_v$ from the image signal V.

The order of Step SB2 and Step SB3 is not particularly limited. Step SB2 may be executed after Step SB3, or Step SB2 and Step SB3 may be executed in parallel.

When Step SB3 is executed, the feature correlation coefficient calculation unit 214 calculates a feature correlation coefficient (synchronized correlation coefficient) by temporally synchronizing the acoustic feature $f_s$ calculated at Step SB2 and the image feature $f_v$ calculated at Step SB3 (Step SB4). When Step SB4 is executed, the feature correlation coefficient calculation unit 214 calculates a feature correlation coefficient (unsynchronized correlation coefficient) by temporally unsynchronizing the acoustic feature calculated at Step SB2 and the image feature calculated at Step SB3 (Step SB5). The feature correlation coefficients calculated at Steps SB4 and SB5 are the same as the feature correlation coefficient calculated at Steps SA4, except that the temporally synchronizing and/or unsynchronizing operation is executed.

Figure 12:
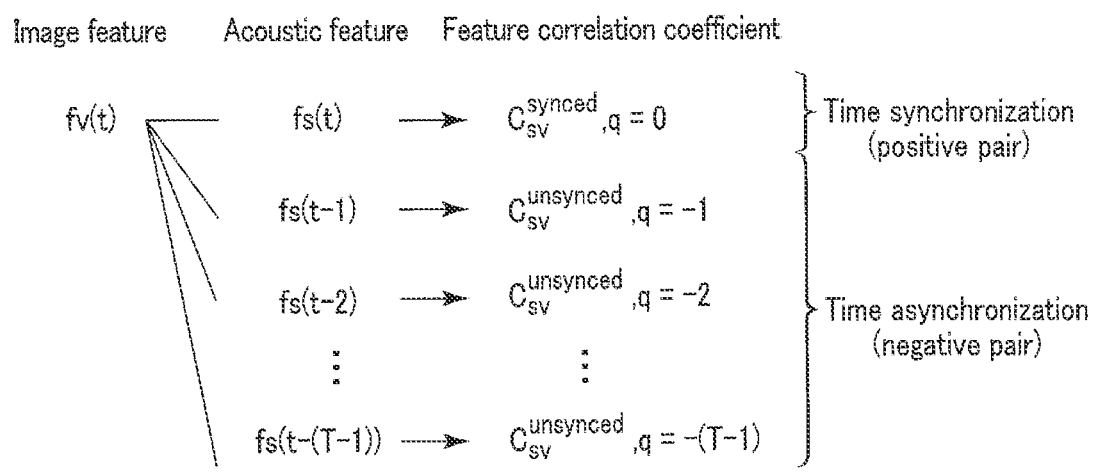
FIG. 12 is a diagram illustrating a calculation example of a synchronized correlation coefficient and an unsynchronized correlation coefficient.

FIG. 12 is a diagram illustrating a calculation example of the synchronized correlation coefficient and the unsynchronized correlation coefficient. First, a calculation example of the synchronized correlation coefficient will be explained. As illustrated in FIG. 12, the processing circuit 21 calculates a first synchronized correlation coefficient $C_{sv}^{synced}$ based on the inner product of the image feature $f_v$ and the acoustic feature $f_s$, while synchronizing the frame time of the image feature $f_v$ and the frame time of the acoustic feature $f_s$. The temporally synchronized image feature $f_v$ and the acoustic feature $f_s$ may also be expressed as "image feature $f_v$ (t)" and "acoustic feature $f_s$ (t)", respectively. In this case, a time difference q between the image feature $f_v$ (t) and the acoustic feature $f_s$ (t) is "q=0".

More specifically, the first synchronized correlation coefficient $C_{sv}^{synced}$ is expressed with the following expression (4). The first synchronized correlation coefficient $C_{sv}^{synced}$ is the same as the first synchronized correlation coefficient $C_{sv}$ calculated at Step SA4.

$$C_{sv}^{synced}(t, q, e, i) = \frac{f_v(t, e, i)^T \cdot f_s(t)}{\|f_v(t, e, i)\| \cdot \|f_s(t)\|} \quad (4)$$

Thereafter, the processing circuit 21 calculates the second synchronized correlation coefficient $C_{sv}^{synced'}(t)$ on the basis of the first synchronized correlation coefficient $C_{sv}^{synced}$. The second synchronized correlation coefficient $C_{sv}^{synced'}(t)$ is calculated as a scalar value of the maximum spatial response for the dimension E and the dimension I, and specifically expressed with the following expression (5). The second synchronized correlation coefficient $C_{sv}^{synced'}(t)$ is the same as the second synchronized correlation coefficient $C'_{sv}(t)$ calculated at Step SA4.

$$C_{sv}^{synced'}(t) = \max_{e,i} C_{sv}^{synced}(t, e, i) \quad (5)$$

The following is an explanation of a calculation example of the unsynchronized correlation coefficient. As illustrated in FIG. 12, the processing circuit 21 calculates a first unsynchronized correlation coefficient $C_{sv}^{unsynced}$ based on the inner product of the image feature $f_v$ and the acoustic feature $f_s$, while unsynchronizing the frame time of the image feature $f_v$ and the frame time of the acoustic feature $f_s$ by the time difference q. Specifically, the processing circuit 21 fixes the frame time t of the image feature $f_v$ (t), and shifts the frame time t of the acoustic feature $f_s$ with respect to the frame time t of the image feature $f_v$ by the time difference q∈{−1, −2, . . . , −(T−1)} to generate the acoustic feature $f_s$ (t−1), $f_s$ (t−2), . . . , $f_s$ (−(t−1)). In addition, the processing circuit 21 calculates the first unsynchronized correlation coefficient $C_{sv}^{unsynced}$ based on the inner product of the image feature $f_v$ (t) and the image feature $f_s$ (t+q) for each time difference q. For example, when the time sections of the input signal have a length of 10 seconds, the time difference should be set to 1 second, 2 seconds, . . . , 9 seconds, and the first unsynchronized correlation coefficient $C_{sv}^{unsynced}$ should be calculated for each of the time differences. The time difference q may be set to any value, as long as the value is shorted than the time sections T of the input signal. The number of time differences q may be any number of 1 or more, and is not particularly limited.

More specifically, the first unsynchronized correlation coefficient $C_{sv}^{unsynced}$ (t+q, e, i)) is expressed with the following expression (6). In the expression, "$f_s$ (t+q" is an acoustic feature vector at the frame time E {1, 2, ..., T}, and serves as an example of the acoustic feature. $f_v$ (t, e, i) is an image feature vector at the ordinate e∈ {1, 2, ..., E} compressed to the E dimension and the abscissa i∈ {1, 2, ..., I} compressed to the I dimension, and an example of the image feature.

Specifically, the first unsynchronized correlation coefficient $C_{sv}^{unsynced}$ (t+q, e, i) is a cosine similarity to measure the distance between the acoustic feature $f_s$ and the image feature $f_v$. The first unsynchronized correlation coefficient $C_{sv}^{unsynced}$ is not limited to cosine similarity, as long as it is an index to measure the distance between the acoustic feature $f_s$ and the image feature $f_v$. For example, the first unsynchronized correlation coefficient $C_{sv}^{unsynced}$ may be a Euclidean distance, a Manhattan distance, or a Mahalanobis distance.

$$C_{sv}^{unsynced}(t+q, e, i) = \frac{f_v(t, e, i)^T \cdot f_s(t+q)}{\|f_v(t, e, i)\| \cdot \|f_s(t+q)\|} \quad (6)$$

Thereafter, the processing circuit 21 calculates the second unsynchronized correlation coefficient $C_{sv}^{unsynced'}$ (t+q) on the basis of the first unsynchronized correlation coefficient $C_{sv}^{unsynced}$ (t+q, e, i). The second unsynchronized correlation coefficient $C_{sv}^{unsynced'}$ (t+q) is calculated as a scalar value of the maximum spatial response for the dimension E and the dimension I, and specifically expressed with the following expression (7). Specifically, the second unsynchronized correlation coefficient $C_{sv}^{unsynced'}$ (t+q) is a maximum value in a plurality of first unsynchronized correlation coefficients $C_{sv}^{unsynced}$ (t+q, e, i) corresponding to a plurality of combinations of the ordinate e and the abscissa i and calculated for the respective frame times t. The second unsynchronized correlation coefficient $C_{sv}^{unsynced'}$ (t+q) is an unsynchronized correlation coefficient of the final output form. The second unsynchronized correlation coefficient may be any value based on a plurality of unsynchronized correlation coefficients corresponding to a plurality of combinations of the ordinate e and the abscissa i, and may be, for example, any p-quartile, such as the minimum value, the intermediate value, and the mean value in a plurality of unsynchronized correlation coefficients. The first unsynchronized correlation coefficient in any noted combination (pixel) of the ordinate e and abscissa i may be set as the second unsynchronized correlation coefficient.

$$C_{sv}^{unsynced'}(t+q) = \max_{e,i} C_{sv}^{unsynced}(t+q, e, i) \quad (7)$$

The order of steps from Step SB2 to Step SB5 is not limited only to the example described above. For example, the steps may be executed in the order "Steps SB2, SB4, SB3, and SB5". As another example, "Steps SB2-SB4" and "Steps SB3-SB5" may be executed in parallel.

When Step SB5 is executed, the update unit 215 updates the first neural network and the second neural network using a loss function based on the second synchronized correlation coefficient $C_{sv}^{synced'}$ (t) calculated at Step SB4 and the second unsynchronized correlation coefficient $C_{sv}^{unsynced'}$ (t) calculated at Step SB5 (Step SB6). At Step SB6, the update unit 215 calculates a contrastive loss as the loss function.

The contrastive loss is a loss function using the synchronized correlation coefficient $C_{sv}^{synced'}$ (t) as a positive pair and the unsynchronized correlation coefficient $C_{sv}^{unsynced'}$ (t) as a negative pair. The positive pair means a combination of the acoustic feature and the image feature temporally synchronized with each other, and functions as a positive sample. The negative pair means a combination of the acoustic feature and the image feature temporally unsynchronized with each other, and functions as a negative sample. The contrastive loss is a scale used as a loss function of self-supervised learning and evaluating the distance between the synchronized correlation coefficient and the unsynchronized correlation coefficient. Specifically, as expressed with the following expression (8), a contrastive loss $L_{contrastive}$ is expressed in the softmax function form based on the integrated value of the synchronized correlation coefficient $C_{sv}^{synced'}$ (t) and a plurality of unsynchronized correlation coefficients $C_{sv}^{unsynced'}$ (t) having mutually different time differences q.

$$\mathcal{L}_{contrastive} = -\log\frac{\exp(C_{sv}^{synced'}(t))}{\exp(C_{sv}^{synced'}(t)) + \Sigma_q \exp(C_{sv}^{unsynced'}(t+q))} \quad (8)$$

The update unit 215 updates the learning parameters of the first neural network and the second neural network to minimize the contrastive loss $L_{contrastive}$, in accordance with any desired optimization method. The optimization method may be any method, such as stochastic gradient descent and Adam ((adaptive moment estimation). By minimizing the contrastive loss $L_{contrastive}$, the learning parameters of the first neural network and the second neural network are trained such that the synchronized correlation coefficient increases and the unsynchronized correlation coefficient decreases, that is, such that the distance between the acoustic feature and the image feature relating to the positive pair decreases (the similarity increases) and the distance between the acoustic feature and the image feature relating to the negative pair increases (the similarity decreases). In this manner, the acoustic feature output with the first neural network is correlated with the image feature output with the second neural network. This structure enables the structure in which, for example, the image feature of certain frame time also has a large value when the acoustic feature of the same frame time has a large value, or the image feature of certain frame time also has a small value when the acoustic feature of the same frame time has a small value. This structure enables acquisition of high distinction for voice and non-voice of the acoustic feature and the non-acoustic feature with the first neural network and the second neural network.

When Step SB6 is executed, the determination unit 216 determines whether the stop condition is satisfied (Step SB7). The stop condition may be set, for example, to the condition that the number of updates of learning parameters has reached the predetermined number and/or the condition that the update quantity of the learning parameters is smaller than the threshold. When it is determined that the stop condition is not satisfied (Step SB7: NO), the acquisition unit 211 acquires another acoustic signal and another image signal (Step SB1). Thereafter, the acoustic signal and the image signal are successively subjected to calculation of the acoustic feature with the acoustic feature calculation unit 212 (Step SB2), calculation of the non-acoustic feature with the non-acoustic feature calculation unit 213 (Step SB3), calculation of the synchronized correlation coefficient with the feature correlation coefficient calculation unit 214 (Step SB4), calculation of the unsynchronized correlation coefficient with the feature correlation coefficient calculation unit 214 (Step SB5), update of the first neural network and the second neural network with the update unit 215 (Step SB6), and determination as to whether the stop condition is satisfied with the determination unit 216 (Step SB7).

Steps SB2 to SB7 may be repeated for a training sample (batch learning), or Steps SB2 to SB7 may be repeated for a plurality of training samples (mini-batch learning).

When it is determined at Step SB7 that the stop condition is satisfied (Step SB7: YES), the determination unit 216 outputs the first neural network at the time when the stop condition is satisfied as the first trained model, and outputs the second neural network at the time when the stop condition is satisfied as the second trained model (Step SB8). The first trained model and the second trained model are transmitted to the voice activity detection apparatus 100 via the communication device 24 or the like, and stored in the storage device 12.

When the step SB8 is executed, learning processing with the processing circuit 21 is finished.

The learning processing illustrated in FIG. 10 is an example, and the present embodiment is not limited thereto. For example, in the embodiment described above, the acoustic feature is unsynchronized with the image feature with a time difference q, but the image feature may be unsynchronized with the acoustic feature with a time difference q.

As described above, the learning apparatus 200 includes at least the acoustic feature calculation unit 212, the non-acoustic feature calculation unit 213, the feature correlation coefficient calculation unit 214, and the update unit 215. The acoustic feature calculation unit 212 calculates the acoustic feature from the acoustic signal using the first neural network. The non-acoustic feature calculation unit 213 calculates the non-acoustic feature from the non-acoustic signal using the second neural network. The feature correlation coefficient calculation unit 214 calculates the synchronized correlation coefficient on the basis of the acoustic feature and the non-acoustic feature temporally synchronized with each other, and calculates the unsynchronized correlation coefficient on the basis of the acoustic feature and the non-acoustic feature temporally unsynchronized with each other. The update unit 215 updates the first neural network and the second neural network using a loss function based on the synchronized correlation coefficient and the unsynchronized correlation coefficient.

The structure described above enables update of the first neural network and the second neural network by self-supervised learning using a loss function defined on the basis of the feature correlation coefficient (synchronized correlation coefficient) calculated on the basis of the acoustic feature and the non-acoustic feature temporally synchronized with each other and the feature correlation coefficient (unsynchronized correlation coefficient) calculated on the basis of the acoustic feature and the non-acoustic feature temporally unsynchronized with each other. Because the loss function described above is used, the present embodiment enables generation of the first trained model capable of calculating an acoustic feature with high discrimination for voice and non-voice and the second trained model capable of calculating an image feature (acoustic feature) with high discrimination for voice and non-voice. Consequently, the voice activity detection apparatus 100 is capable of detecting a voice section and/or a non-voice section with high accuracy, because it detects a voice section and/or a non-voice section using the acoustic feature calculated with the first trained model and the image feature (non-acoustic feature) calculated with the second trained model.

For example, the techniques disclosed in Patent Literatures 1 and 2 are supervised learning methods, and require accurate prior supervising work for the non-voice time sections of a large quantity of training data, to enhance the performance. The technique disclosed in Patent Literature 2 also requires lip region detection processing in the images and/or prior estimation processing to acquire accurate values for the lengths of the lips in the horizontal direction and the vertical direction. The learning method according to the present embodiment executes self-supervised learning using the synchronized correlation coefficient as a positive sample and the unsynchronized correlation coefficient as a negative sample, and enables omission of the supervising label work.

Application Example

The following is an explanation of the voice activity detection apparatus 100 and the learning apparatus 200 according to an application example of the present embodiment. In the embodiment described above, the voice collection environment of the acoustic signal is not specifically referred to. The application example illustrates detection of a voice section and/or a non-voice section under noise environment. In the following explanation, constituent elements having substantially the same functions as those of the present embodiment will be denoted by the same reference numerals, and an overlapping explanation is made only when necessary.

Figure 13:
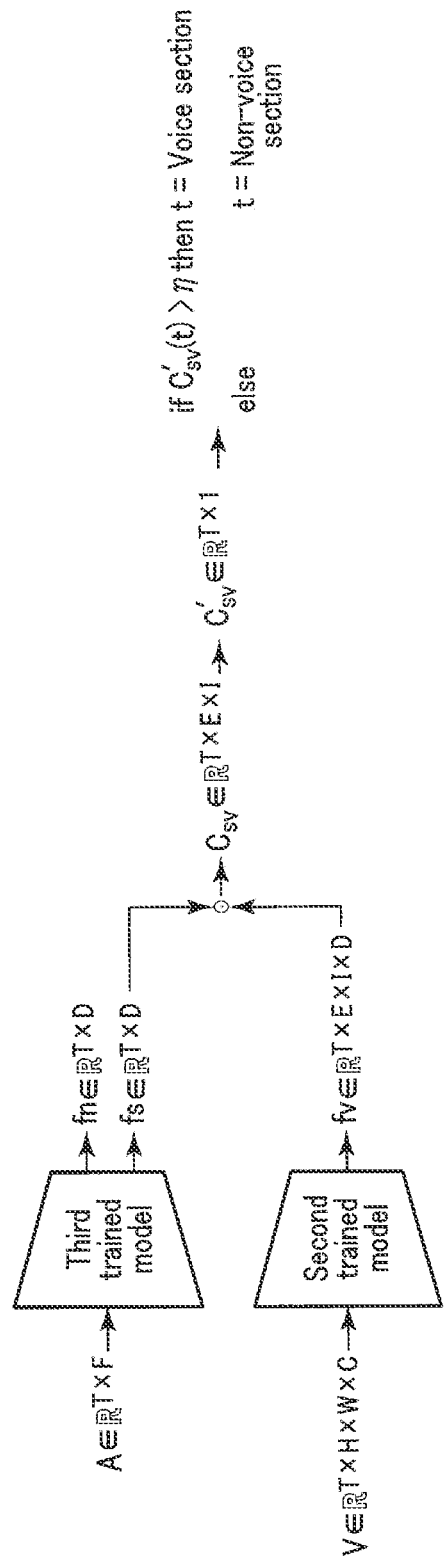
FIG. 13 is a diagram schematically illustrating the voice activity detection processing according to an application example.

FIG. 13 is a diagram schematically illustrating the voice activity detection processing according to an application example. As illustrated in FIG. 13, the acquisition unit 111 acquires an input signal including an acoustic signal A and an image signal V. Suppose that the acoustic signal A includes environmental noise (noise). The environmental noise according to the present embodiment is sound other than the speaker's voice, and may be noise actually generated in voice collection, or noise generated in the circuit in or subsequent to the microphone.

The acoustic feature calculation unit 112 inputs the acoustic signal A to a third trained model and outputs an acoustic feature $f_s$ and a noise feature $f_n$. The third trained model is generated with the learning apparatus 200 according to the application example. The noise feature $f_n$ has a larger value as noise provides larger contribution to the acoustic signal A, and has a smaller value as noise provides smaller contribution to the acoustic signal A. For example, the noise feature $f_n$ is designed to have a value ranging from the upper limit value "1" to the lower limit value "0". The third trained model is a neural network trained to receive the acoustic signal A and output an acoustic feature $f_s$ and a noise feature $f_n$. For example, an encoder network trained to convert the acoustic signal A into an acoustic feature $f_s$ and a noise feature $f_n$ is used as the neural network. As described later, the third trained model learns the acoustic feature $f_s$ and the noise feature $f_n$ in distinction from each other. For this reason, the acoustic feature $f_s$ is expected to have dominant contribution of voice uttered by the speaker, and the noise feature $f_n$ is expected to have dominant contribution of noise serving as sound other than the voice uttered by the speaker.

The non-acoustic feature calculation unit 113 inputs the image signal V to the second trained model and outputs an image feature $f_v$. The feature correlation coefficient calculation unit 114 calculates a first feature correlation coefficient $C_{sv}$ on the basis of the acoustic feature $f_s$ and the image feature $f_v$, and calculates a second feature correlation coefficient $C'_{sv}$ on the basis of the first feature correlation coefficient $C_{sv}$. The voice section detection unit 115 detects a voice section and/or a non-voice section on the basis of comparison of the second feature correlation coefficient $C_{sv}$ with the threshold η.

The application example is expected to enhance the discrimination in comparison with the embodiment described above, because a voice section and/or a non-voice section is detected using the acoustic feature $f_s$ output in distinction from the noise feature $f_n$.

Figure 14:
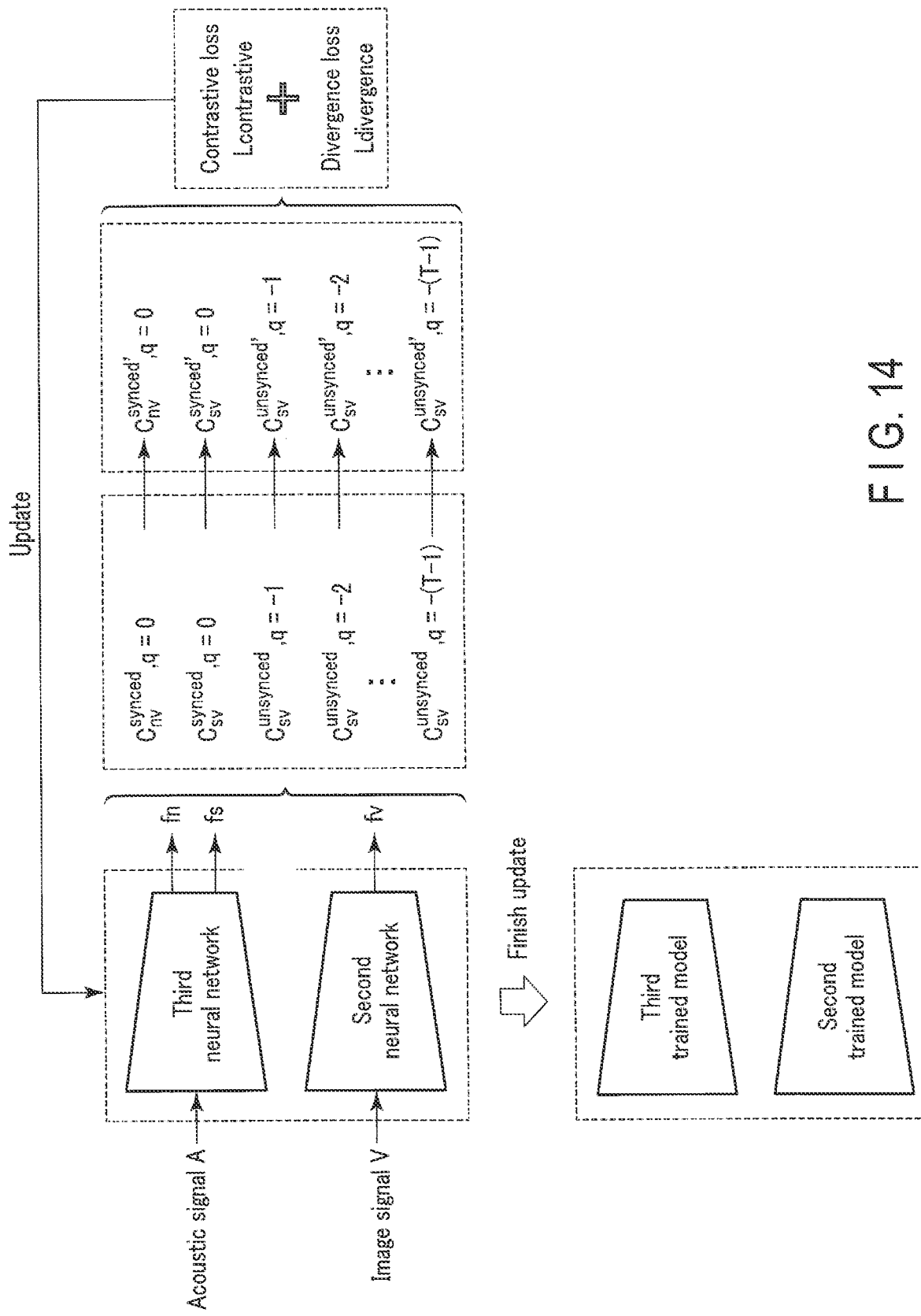
FIG. 14 is a diagram schematically illustrating learning processing according to the application example.

FIG. 14 is a diagram schematically illustrating learning processing according to the application example. As illustrated in FIG. 14, the acquisition unit 211 acquires an input signal (training sample) including an acoustic signal A and an image signal V. The acoustic feature calculation unit 212 inputs the acoustic signal A to the third neural network and outputs an acoustic feature $f_s$ and a noise feature $f_n$. The third neural network has architecture of an encoder network to enable calculation of the acoustic feature $f_s$ and the noise feature $f_n$ from the acoustic signal A. The non-acoustic feature calculation unit 213 inputs the image signal V to the second neural network and outputs an image feature $f_v$.

As illustrated in FIG. 14, the feature correlation coefficient calculation unit 114 calculates a first synchronized correlation coefficient $C_{nv}^{synced}$ on the basis of the noise feature $f_v$ and the image feature $f_v$ temporally synchronized with each other. More specifically, first, the feature correlation coefficient calculation unit 114 calculates a first synchronized correlation coefficient $C_{nv}^{synced}$ based on the inner product of the noise feature $f_n$ and the image feature $f_v$. For example, cosine similarity as expressed with the following expression (9) is used as the first synchronized correlation coefficient $C_{nv}^{synced}$. The cosine similarity is used to evaluate a distance between the noise feature $f_v$ and the image feature $f_v$. The first synchronized correlation coefficient $C_{nv}^{synced}$ is not limited to cosine similarity, as long as it is an index to measure the distance between the noise feature $f_n$ and the image feature $f_v$. For example, the first synchronized correlation coefficient $C_{nv}^{synced}$ may be a Euclidean distance, a Manhattan distance, or a Mahalanobis distance.

$$C_{nv}^{sysnced}(t, e, i) = \frac{f_v(t, e, i)^T \cdot f_n(t)}{\|f_v(t, e, i)\| \cdot \|f_n(t)\|} \qquad (9)$$

Thereafter, the feature correlation coefficient calculation unit 214 calculates the second synchronized correlation coefficient $C_{nv}^{synced'}$ on the basis of the first synchronized correlation coefficient $C_{nv}^{synced}$. The second synchronized correlation coefficient $C_{nv}^{synced'}$ is calculated as a scalar value for each frame time t, and expressed with, for example, the following expression (10). The second synchronized correlation coefficient may be any value based on a plurality of first synchronized correlation coefficients corresponding to a plurality of combinations of the ordinate e and the abscissa i, for example, may be any p-quartile, such as the minimum value, the intermediate value, and the mean value in a plurality of first synchronized correlation coefficients. The first synchronized correlation coefficient in any noted combination (pixel) of the ordinate e and abscissa i may be set as the second synchronized correlation coefficient.

$$C_{nv}^{sysnced'}(t) = \max_{e,i} C_{nv}^{sysnced}(t, e, i) \qquad (10)$$

In addition, as illustrated in FIG. 14, the feature correlation coefficient calculation unit 214 calculates a first synchronized correlation coefficient $C_{sv}^{synced}$ on the basis of the acoustic feature $f_s$ and the image feature $f_v$ temporally synchronized with each other, and calculates a second feature correlation coefficient $C_{sv}^{synced'}$ on the basis of the first synchronized correlation coefficient $C_{sv}^{synced}$, in the same manner as the embodiment described above. The feature correlation coefficient calculation unit 214 also calculates a first unsynchronized correlation coefficient $C_{sv}^{unsynced}$ on the basis of the acoustic feature $f_s$ and the image feature $f_v$ temporally unsynchronized with each other, and calculates a second unsynchronized correlation coefficient $C_{sv}^{unsynced'}$ on the basis of the first unsynchronized correlation coefficient $C_{sv}^{unsynced}$.

Figure 15:
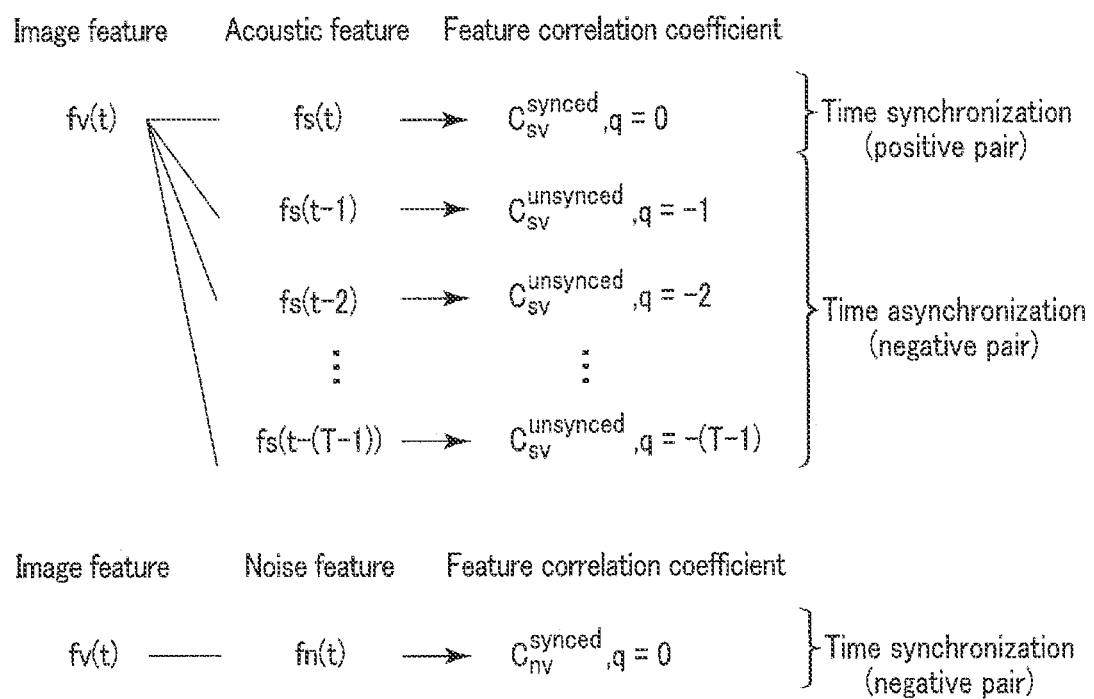
FIG. 15 is a diagram illustrating a calculation example of the synchronized correlation coefficient and the unsynchronized correlation coefficient according to the application example.

FIG. 15 is a diagram illustrating a calculation example of the synchronized correlation coefficient and the unsynchronized correlation coefficient. As illustrated in FIG. 15, the feature correlation coefficient calculation unit 214 calculates the synchronized correlation coefficient $C_{sv}^{synced}$ and a plurality of unsynchronized correlation coefficients $C_{sv}^{unsynced}$, while changing the time difference q of the acoustic feature $f_s$ from the image feature $f_v$ from 0 to T−1, in the same manner as the embodiment described above. The feature correlation coefficient calculation unit 214 calculates a synchronized correlation coefficient $C_{nv}^{synced}$ on the basis of the image feature $f_v$ and the noise feature $f_n$. Because the environmental noise is regarded as temporally substantially fixed, the noise feature $f_n$ is also supposed to be temporally substantially fixed.

As illustrated in FIG. 14, the update unit 215 calculates a loss function on the basis of the synchronized correlation coefficient $C_{nv}^{synced'}$ between the noise feature and the image feature, the synchronized correlation coefficient $C_{sv}^{synced'}$ between the acoustic feature and the image feature, and the unsynchronized correlation coefficient $C_{sv}^{unsynced'}$ between the acoustic feature and the image feature. The loss function $L_{total}$ according to the application example is defined as the sum of the contrastive loss $L_{contrastive}$ and the divergence loss $L_{divergence}$, as expressed with the following expression (11).

$$\mathcal{L}_{total} = \mathcal{L}_{contrastive} + \mathcal{L}_{divergence} \qquad (11)$$

The contractive loss $L_{contrastive}$ according to the application example is a loss function using the synchronized correlation coefficient $C_{sv}^{synced'}$ (t) as a positive pair and the unsynchronized correlation coefficient $C_{sv}^{unsynced'}$ (t) and the synchronized correlation coefficient $C_{nv}^{synced'}$ as negative pairs. The synchronized correlation coefficient $C_{nv}^{synced'}$ between the noise feature and the image feature temporally synchronized with each other is used as a negative pair, because learning is required to distinguish the synchronized correlation coefficient $C_{nv}^{synced'}$ from the synchronized correlation coefficient $C_{sv}^{synced'}$ between the acoustic feature and the image feature temporally synchronized with each other. As expressed with the following expression (12), the contrastive loss $L_{contrastive}$ according to the application example is expressed in the softmax function form based on the synchronized correlation coefficient $C_{sv}^{synced'}$ (t), the integral of a plurality of unsynchronized correlation coefficients $C_{sv}^{unsynced'}(t)$ having mutually different time differences q, and the synchronized correlation coefficient $C_{nv}^{synced'}$.

$$\mathcal{L}_{contrastive} = -\log \frac{\exp(C_{sv}^{synced'}(t))}{\exp(C_{sv}^{synced'}(t)) + \sum_{q} \exp(C_{sv}^{unsynced'}(t+q)) + \exp(C_{nv}^{sysnced'}(t))} \quad (12)$$

The divergence loss $L_{divergence}$ is a function to evaluate the distance between the acoustic feature $f_s$ and the noise feature $f_n$. The divergence loss $L_{divergence}$ provides penalty to the distance such that the distance between the acoustic feature $f_s$ and the noise feature $f_n$ increases. For example, the divergence loss $L_{divergence}$ is calculated on the basis of the cosine similarity between the acoustic feature $f_s$ and the noise feature $f_n$, as expressed with the following expression (13).

$$\mathcal{L}_{divergence} = \quad (13)$$
$$-\log \frac{1}{1 + \exp\left(\frac{f_s(t)^T \cdot f_n(t)}{\|f_s(t)\| \cdot \|f_n(t)\|}\right)} \approx -f_s(t) \cdot \log \frac{f_s(t)}{f_n(t)} \approx f_s(t) \cdot \exp(f_n(t))$$

The update unit 215 updates the learning parameters of the third neural network and the second neural network in parallel to minimize the loss function according to the application example, in accordance with any desired optimization method. The determination unit 216 determines whether the stop condition is satisfied. When it is determined that the stop condition is not satisfied, another training sample is successively subjected to calculation of the acoustic feature and the noise with the acoustic feature calculation unit 212, calculation of the non-acoustic feature with the non-acoustic feature calculation unit 213, calculation of the synchronized correlation coefficient with the feature correlation coefficient calculation unit 214, calculation of the unsynchronized correlation coefficient with the feature correlation coefficient calculation unit 214, update of the third neural network and the second neural network with the update unit 215, and determination as to whether the stop condition is satisfied with the determination unit 216. When it is determined that the stop condition is satisfied, the determination unit 216 outputs the third neural network at the time when the stop condition is satisfied as the third trained model, and outputs the second neural network at the time when the stop condition is satisfied as the second trained model. The stop condition may be set, for example, to the condition that the number of updates of learning parameters has reached the predetermined number and/or the condition that the update quantity of the learning parameters is smaller than the threshold.

By minimizing the loss function according to the application example, the learning parameters of the third neural network and the second neural network are trained such that the distance between the acoustic feature and the image feature relating to a positive pair decreases (the similarity increases) and the distance between the acoustic feature and the image feature relating to a negative pair increases (the similarity decreases), while the distance between the acoustic feature and the noise feature increases (the similarity decreases). In this manner, the acoustic feature and the noise feature output with the third neural network are not correlated, and the acoustic feature output with the third neural network is correlated with the image feature output with the second neural network. With this structure, the application example enables distinction of the acoustic feature from the noise feature, and enhances discrimination of voice and non-voice of the acoustic feature and the non-acoustic feature.

The embodiment described above is an example, and various modifications thereof are possible. For example, the acoustic signal is a voice signal in the embodiment, but the acoustic signal may be a vocal cord signal or a vocal tract signal acquired by decomposing the voice signal. As another example, the acoustic signal is waveform data of a sound pressure value in the time region or the frequency region in the embodiment, but the waveform data may be data converted into any desired space.

In the embodiment described above, the voice activity detection apparatus 100 calculates the acoustic feature using the first or third trained model, and calculates the image feature using the second trained model. However, the acoustic feature and the image feature are not necessarily calculated using the trained models, as long as the features are correlated with voice uttered by the speaker. For example, a threshold distinguishing voice and silence may be set, the acoustic feature may be set to "1" when the peak value of the acoustic signal is higher than the threshold, and the acoustic feature may be set to "0" when the peak value is lower than the threshold. As another example, an image signal of the lip region may be subjected to image processing to calculate a geometrical feature quantity of the lip region, the image feature may be set to "1" when the lip region has a feature quantity indicating that the mouth is opened, and the image feature may be set to "0" when the lip region has a feature quantity indicating that the mouth is closed. As another example, values of the acoustic feature and the image feature may be assigned manually.

Accordingly, the embodiment described above enables execution of voice activity detection with light load.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A voice activity detection apparatus comprising a processing circuit configured to:
   calculate an acoustic feature based on an acoustic signal;
   calculate a non-acoustic feature based on a non-acoustic signal;
   calculate a correlation coefficient based on the acoustic feature and the non-acoustic feature; and
   detect a voice section and/or a non-voice section based on a comparison of the correlation coefficient with a threshold, the voice section being a time section in which voice is presence, the non-voice section being a time section in which voice is absence,
   wherein the processing circuit calculates the acoustic feature from the acoustic signal using a first trained model, and calculates the non-acoustic feature from the non-acoustic signal using a second trained model, the correlation coefficient includes a first correlation coefficient calculated based on the acoustic feature and the non-acoustic feature temporally synchronized with each other, and a second correlation coefficient calculated based on the acoustic feature and the non-acoustic feature temporally unsynchronized with each other, and the first trained model and the second trained model are generated by self-supervised learning using the first correlation coefficient and the second correlation coefficient.

2. The voice activity detection apparatus according to claim 1, wherein the non-acoustic signal is an image signal temporally synchronized with the acoustic signal.

3. The voice activity detection apparatus according to claim 1, wherein the processing circuit acquires the acoustic signal and the non-acoustic signal relating to same voice generation source.

4. A learning apparatus comprising a processing circuit configured to:
calculate an acoustic feature from an acoustic signal using a first neural network;
calculate a non-acoustic feature from a non-acoustic signal using a second neural network;
calculate a first correlation coefficient based on the acoustic feature and the non-acoustic feature temporally synchronized with each other, and calculate a second correlation coefficient based on the acoustic feature and the non-acoustic feature temporally unsynchronized with each other; and
train the first neural network and the second neural network using a loss function based on the first correlation coefficient and the second correlation coefficient.

5. The learning apparatus according to claim 4, wherein processing circuit calculates a value based on inner product of the acoustic signal and the non-acoustic signal times of which are mutually synchronized, as the first correlation coefficient, and calculates a value based on inner product of the acoustic signal and the non-acoustic signal times of which are mutually unsynchronized, as the second correlation coefficient.

6. The learning apparatus according to claim 4, wherein the processing circuit calculates a value based on inner product of the acoustic signal and the non-acoustic signal times of which are mutually synchronized, as the first correlation coefficient, and calculates a value based on inner product of the acoustic signal and the non-acoustic signal times of which are mutually unsynchronized by a time difference, for each of a plurality of the time differences, as the second correlation coefficient.

7. The learning apparatus according to claim 5, wherein the loss function is a softmax function including the first correlation coefficient and the second correlation coefficient.

8. The learning apparatus according to claim 6, wherein the loss function is a softmax function including the first correlation coefficient and the second correlation coefficient.

9. The learning apparatus according to claim 4, wherein the loss function includes a contrastive loss using the first correlation coefficient as a positive sample and the second correlation coefficient as a negative sample, the first correlation coefficient is acquired with the acoustic feature and the non-acoustic feature temporally synchronized with each other, and the second correlation coefficient is acquired with the acoustic feature and the non-acoustic feature temporally unsynchronized with each other.

10. The learning apparatus according to claim 4, wherein the processing circuit:
calculates a noise feature from the acoustic signal,
calculates a third correlation coefficient on the basis of the noise feature and the non-acoustic feature, and
updates the first neural network and the second neural network using the loss function based on the first correlation coefficient, the second correlation coefficient, and the third correlation coefficient.

11. The learning apparatus according to claim 10, wherein the loss function includes a contrastive loss using the first correlation coefficient as a positive sample, and the second correlation coefficient and the third correlation coefficient as negative samples, the first correlation coefficient is acquired with the acoustic feature and the non-acoustic feature temporally synchronized with each other, the second correlation coefficient is acquired with the acoustic feature and the non-acoustic feature temporally unsynchronized with each other, and the third correlation coefficient is acquired with the noise feature and the non-acoustic feature temporally synchronized with each other.

12. The learning apparatus according to claim 10, wherein the loss function includes sum of the contrastive loss and a divergence loss, and
the divergence loss is a function evaluating a distance between the acoustic feature and the noise feature and provides penalty to the distance.

13. The learning apparatus according to claim 4, wherein the non-acoustic signal is an image signal temporally synchronized with the acoustic signal.

14. A voice activity detection program comprising:
calculating an acoustic feature on the basis of an acoustic signal using a first rained model;
calculating a non-acoustic feature based on a non-acoustic signal using a second trained model;
calculating a correlation coefficient based on the acoustic feature and the non-acoustic feature; and
detecting a voice section and/or a non-voice section based on a comparison of the correlation coefficient with a threshold, the voice section being a time section in which voice is presence, the non-voice section being a time section in which voice is absence,
wherein the correlation coefficient includes a first correlation coefficient calculated based on the acoustic feature and the non-acoustic feature temporally synchronized with each other, and a second correlation coefficient calculated based on the acoustic feature and the non-acoustic feature temporally unsynchronized with each other, and
the first trained model and the second trained model are generated by self-supervised learning using the first correlation coefficient and the second correlation coefficient.

* * * * *